(12) United States Patent
Honda et al.

(10) Patent No.: US 8,898,516 B2
(45) Date of Patent: Nov. 25, 2014

(54) FAULT-TOLERANT COMPUTER SYSTEM

(75) Inventors: Makoto Honda, Menlo Park, CA (US); Kanji Hirano, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 398 days.

(21) Appl. No.: 13/316,314

(22) Filed: Dec. 9, 2011

(65) Prior Publication Data
US 2013/0151894 A1 Jun. 13, 2013

(51) Int. Cl.
*G06F 11/00* (2006.01)

(52) U.S. Cl.
USPC .............. 714/10; 714/11; 714/13; 714/17

(58) Field of Classification Search
CPC . G06F 11/0721; G06F 11/14; G06F 11/1402; G06F 11/1405; G06F 11/1456; G06F 11/16; G06F 11/181; G06F 11/20; G06F 11/202; G06F 11/2023; G06F 11/2028; G06F 11/2033; G06F 11/2038; G06F 11/2041
USPC ................ 714/2, 10, 11, 13, 16, 17
See application file for complete search history.

(56) References Cited

U.S. PATENT DOCUMENTS

| | | | | |
|---|---|---|---|---|
| 7,331,043 B2* | 2/2008 | Saulsbury | | 714/11 |
| 2003/0163763 A1* | 8/2003 | DeLano | | 714/15 |
| 2004/0153763 A1* | 8/2004 | Grochowski et al. | | 714/17 |
| 2006/0101307 A1* | 5/2006 | Rapp et al. | | 714/13 |
| 2009/0044049 A1* | 2/2009 | Luick | | 714/11 |
| 2010/0058107 A1* | 3/2010 | Blaauw et al. | | 714/2 |
| 2011/0161630 A1* | 6/2011 | Raasch et al. | | 714/13 |
| 2011/0302450 A1* | 12/2011 | Hickey et al. | | 714/17 |
| 2012/0047398 A1* | 2/2012 | Vera et al. | | 714/17 |

FOREIGN PATENT DOCUMENTS

| | | |
|---|---|---|
| JP | 06222939 | 8/1994 |
| JP | 06324898 | 11/1994 |
| JP | 2010049589 | 3/2010 |

OTHER PUBLICATIONS

Mukherjee, "Chapter 3 entitled " Architectural Vulnerability Analysis from "Architecture Design for Soft Errors", pp. 79-120, Morgan Kaufmann 2007.

Mukherjee, "Chapter 6 entitled Fault Detection via Redundant Execution" from "Architecture design for soft errors", pp. 207-251, Morgan Kaufmann 2007.

Meixner et al., "Argus: Low-Cost, Comprehensive Error Detection in Simple Cores", 40th Annual International Symposium on MIcroarchitecture (MICRO), Dec. 2007, pp. 1-13.

(Continued)

*Primary Examiner* — Joseph D Manoskey
(74) *Attorney, Agent, or Firm* — Patent Law Works LLP

(57) ABSTRACT

A system and method for providing a fault-tolerant basis to execute instructions is disclosed. The system comprises an error detector, a rewriting module, a recovery engine, a fault locator and a fallback programming module. The error detector detects a first error in the execution of an instruction in a faulty stage unit of a first pipeline unit. The rewriting module rewrites the instruction to form a rewritten instruction responsive to detecting the first error. The recovery engine executes the rewritten instruction in the first pipeline unit. The error detector determines if a second error occurs in the execution of the rewritten instruction. Responsive to detecting the second error, the recovery engine selects a substitute stage unit for the faulty stage unit from a second pipeline unit. The fault locator locates a faulty component for the faulty stage unit. The fallback programming module establishes a fallback unit for the faulty component.

17 Claims, 11 Drawing Sheets

(56) References Cited

OTHER PUBLICATIONS

Meixner et al., "Error Detection Using Dynamic Dataflow Verification", International Conference on Parallel Architectures and Compilation Techniques (PACT) Sep. 2007, pp. 104-115.

Lo et al., "An SFS Berger Check Prediction ALU and Its Application to Self-Checking Processor Designs", IEEE Transaction on Computer-Aided Design, vol. II, No. 4, Apr. 1992, pp. 525-540.

Chen, et al., "Diagnosis Framework for Locating Failed Segments of Path Delay Faults", IEEE Transactions, vol. 16, No. 6 (2008): pp. 755-765.

* cited by examiner

FAULT-TOLERANT COMPUTER SYSTEM

BACKGROUND

The specification relates to a computer system. In particular, the specification relates to a fault-tolerant computer system.

Modern automobiles are frequently designed to utilize numerous electronic control units ("ECUs"). Some automobiles have more than seventy ECUs. An ECU is a processor-based system that controls one or more of the electrical systems or subsystems in an automobile. For example, ECUs control fuel injection and ignition timing functions in the internal combustion engine of most automobiles. These functions are critical to automobile operation, and their failure could have potentially life-threatening repercussions for the human users of the automobile.

A current trend in ECU design is to use processors based on smaller geometry transistors. Processors based on smaller geometry transistors offer numerous benefits for ECU design. For example, these processors tend to be cheaper than other processors, and thus allow ECUs to be produced at a lower cost. Furthermore, these processors based on smaller geometry transistors operate at higher speeds and have lower power dissipation requirements than other, more expensive, processors.

Unfortunately, there are numerous disadvantages associated with processors based on smaller geometry transistors. A first problem is that these processors are prone to transient errors. Transient errors are short-term errors in a processor's digital logic. Transient errors are frequently caused by charged alpha particles that are emitted by the sun. These particles strike processor circuitry and generate changes in the processor's substrate. As a result of this substrate change, the processor suffers short-term digital logic errors.

A second problem associated with processors based on smaller geometry transistors is that these processors are prone to persistent errors. Persistent errors are long-term errors in a processor's digital logic. Persistent errors are frequently caused by metal migration and/or overheating of the processor's digital circuitry.

A third problem associated with processors based on smaller geometry transistors is that the individual component parameters, such as transistor transconductance and leakage vary greatly with temperature and time resulting in reduced circuit tolerances, which makes operating conditions more susceptible to transient and permanent logic errors.

Thus, it is desirable to implement a fault-tolerant system that corrects the transient and permanent errors in the processors. However, existing systems for correcting the errors have been proven deficient and undesirable for implementation in ECU design because, for example, the existing systems take a substantial amount of time to recover the processors from errors resulting in a significant degradation for real-time performance. This excessive overhead time is intolerable and impractical for implementation in the ECUs.

SUMMARY OF THE INVENTION

The specification overcomes the deficiencies and limitations of the prior art at least in part by providing a fault-tolerant system that executes instructions on a fault-tolerant basis. The system comprises an error detector, a rewriting module, a recovery engine, a fault locator and a fallback programming module. The error detector detects a first error in the execution of an instruction in a faulty stage unit of a first pipeline unit in a first core. The rewriting module rewrites the instruction to form a rewritten instruction in response to the detection of the first error. The recovery engine executes the rewritten instruction in the first pipeline unit. The error detector determines if a second error occurs in the execution of the rewritten instruction. Responsive to determining the occurrence of the second error, the recovery engine selects a first substitute stage unit for the faulty stage unit from a second pipeline unit in the first core. The recovery engine re-executes the instruction in the first substitute stage unit of the second pipeline unit and non-faulty stage units of the first pipeline unit in the first core. The fault locator locates a faulty component for the faulty stage unit. The fallback programming module establishes a fallback unit for the faulty component.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
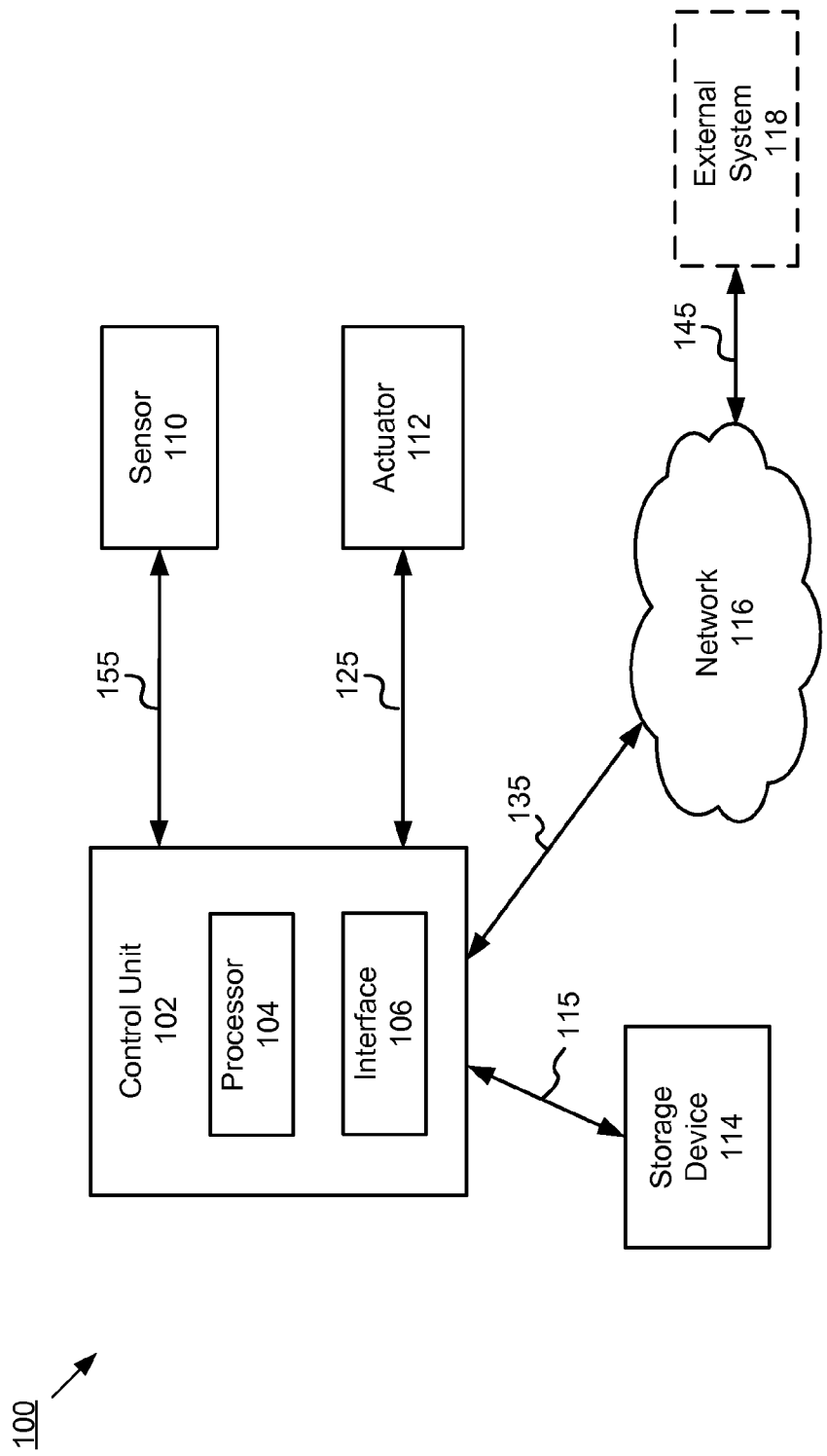
FIG. 1 is a high-level block diagram illustrating one embodiment of a fault-tolerant system.

A system and method for providing a fault-tolerant basis to execute instructions is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a fault-tolerant system 100 according to one embodiment. The system 100 includes a control unit 102, a sensor 110, an actuator 112, a storage device 114, a network 116 and an external system 118. The external system 118 is depicted as a rectangle formed by a dashed line to indicate that it is an optional feature of the system 100. Although only one control unit 102, one sensor 110, one actuator 112, one storage device 114 and one network 116 are depicted in FIG. 1, one skilled in the art will recognize that the system 100 could include one or more control units 102, one or more sensors 110, one or more actuators 112, one or more storage devices 114, one or more networks 116 and one or more external systems 118.

In the illustrated embodiment, the control unit 102 is communicatively coupled to the sensor 110 via signal line 155. The control unit 102 is also communicatively coupled to the actuator 112 via signal line 125. The control unit 102 is communicatively coupled to the storage device 114 via signal line 115. The control unit 102 is coupled to the network 116 via signal line 135. The external system 118 is coupled to the network 116 via signal line 145.

The control unit 102 is any processor-based computing device. In one embodiment, the control unit 102 is an electronic device that controls the operation of the actuator 112. For example, the control unit 102 is an electronic control unit ("ECU") implemented in an automobile. In one embodiment, the control unit 102 is implemented using a single integrated circuit chip such as a system-on-chip (SOC). The control unit 102 comprises, among other things, a processor 104 and an interface 106. The components of the control unit 102 are communicatively coupled to each other. One skilled in the art will recognize that the control unit 102 may comprise any other components such as a memory, a bus, etc.

In one embodiment, the control unit 102 receives input signals from the sensor 110, executes one or more instructions based at least in part on the input signals and generates output signals based at least in part on the execution of the instructions. The control unit 102 controls the actuator 112 by sending the output signals to the actuator 112. In another embodiment, the control unit 102 includes code and routines for providing a fault-tolerant basis to execute instructions in a processor 104 as described below with reference to FIGS. 2-6C.

In one embodiment, the control unit 102 is an ECU and the actuator 112 is a fuel injector in an automobile. The sensor 110 is a sensor for monitoring the amount of oxygen in the engine exhaust. The actuator 112 and the sensor 110 are described below in more detail. For the automobile to operate safely, the amount of fuel passed to the engine (not shown) by the fuel injector is reduced if the amount of oxygen in the exhaust is excessively high (thereby indicating a rich fuel mixture in the engine that could pose a safety risk to the human passengers in the automobile). If there is a dangerous amount of oxygen in the engine exhaust, the sensor 110 relays a signal to the ECU. The ECU (e.g., the control unit 102) processes this signal using a processor 104 and generates an output signal for the actuator 112 (e.g., the fuel injector).

For example, the processor 104 comprised within the control unit 102 uses a subtractor, an adder and a multiplier to calculate a fuel number based at least in part on the signal. The fuel number indicates a certain amount of fuel that is necessary to achieve a safe mixture of oxygen and fuel in the engine. The processor 104 generates an output signal instructing the fuel injector to decrease the amount of fuel in the engine to this certain amount. The processor 104 therefore provides a potentially life-saving function of regulating the mixture of oxygen and fuel in the engine. However, if the processor 104 detects an error occurring in the multiplier when calculating the fuel number, the processor 104 still needs to obtain the correct fuel number to instruct the operation of the fuel injector. Otherwise, the wrong fuel number could lead to a fatal amount of oxygen for human passengers in the automobile. The key for the processor 104 is its capacity to bypass the problematic multiplier and retains the proper execution of multiplication. Therefore, it is particularly desirable to implement a processor 104 that is capable to execute instructions on a fault-tolerant basis.

The processor 104 comprises an arithmetic logic unit, a microprocessor, a general purpose controller or some other processor array to perform computations, retrieve data stored on a memory (e.g., the storage device 114), etc. The processor 104 processes data signals and may comprise various computing architectures including a complex instruction set computer (CISC) architecture, a reduced instruction set computer (RISC) architecture, or an architecture implementing a combination of instruction sets. Although only a single processor is shown in the control unit 102, multiple processors may be included. In one embodiment, the processor 104 receives input signals from the sensor 110 and generates an output signal to control the operation of the actuator 112.

In one embodiment, the processor 104 is a fault-tolerant processor that includes redundant hardware resources and executes instructions on a fault-tolerant basis. For example, the processor 104 includes multi-cores that are implemented in a superscalar architecture and executes instructions using pipelining techniques. The superscalar architecture and the pipelining techniques are described below in more detail with reference to FIG. 2. In one embodiment, an error is detected when the processor 104 is executing an instruction in a first pipeline unit of a core. The pipeline unit is described below in more detail with reference to FIGS. 2 and 4A-4B. The processor 104 recovers from the error by rewriting the instruction and executing the rewritten instruction in the same pipeline unit of the same core. In another embodiment, the processor 104 recovers from the error by executing the instruction in a second pipeline unit of the same core. In yet another embodiment, the processor 104 recovers from the error by executing the instruction in another pipeline unit of another core. The processor 104 is described below in more detail with reference to FIG. 2.

The interface 106 is a device handling communication between components of the control unit 102 and other entities of the system 100. For example, the interface 106 is an input/output (I/O) interface that sends signals and/or data from the control unit 102 to one or more of the sensor 110, the actuator 112 and the storage device 114 and receives signals and/or data from one or more of the sensor 110, the actuator 112 and the storage device 114. In one embodiment, the interface 106 is implemented using an electronic circuit.

In one embodiment, the interface 106 includes a network adapter that couples the control unit 102 to the network 116. For example, the interface 106 includes a network controller that connects the control unit 102 to the network 116 via signal line 135.

The sensor 110 is a device adapted to measure a physical quantity and convert the measurement of the physical quantity into a signal. For example, a sensor 110 is a thermostat that measures a temperature inside an automobile and converts the measurement into a signal. Examples of a physical quantity include, but are not limited to, temperature, stress, pressure, force, light and sound, etc. Examples of a sensor 110 include, but are not limited to, a pressure-sensitive sensor, a temperature-sensitive sensor, a sound-sensitive sensor, a force-sensitive sensor, and a light-sensitive sensor, etc.

In one embodiment, the sensor 110 monitors the actuator 112 and generates a signal indicating the monitoring result. The sensor 110 sends the signal to the control unit 102. For example, the sensor 110 sends the signal to the control unit 102 in real time. The control unit 102 receives the signal and controls the actuator 112 based at least in part on the signal. For example, the control unit 102 controls the adjustment of a valve based at least in part on the signal received from the sensor 110. In one embodiment, the sensor 110 encodes the signal in a format that is supported by the control unit 102. For example, the sensor 110 encodes the signal using binary code.

The actuator 112 is a device for moving or controlling force in an automobile. In one embodiment, the actuator 112 comprises mechanical components, electrical components or a combination of electrical and mechanical components in an automobile. Examples of the actuator 112 include, but are not limited to, a fuel injector, a spark plug, a throttle regulator, and an electronically-controlled valve, etc. In one embodiment, the actuator 112 is controlled by the control unit 102.

The storage device 114 is a non-transitory computer-readable storage medium storing data and information used by the control unit 102 to provide the functionality of the control unit 102. For example, the storage device 114 stores a log including information describing: one or more errors that occur when instructions are executed in the processor 104 and; identifiers of faulty components that incur the errors, etc. The information included in the log is referred to as "log information." In one embodiment, the storage device 114 stores other information such as data received from the sensors 110, actuators 112, external systems 118, etc., for providing the functionality described herein.

In one embodiment, the storage device 114 is a dynamic random access memory (DRAM) device, a static random access memory (SRAM) device, flash memory or some other memory device known in the art. In another embodiment, the storage device 114 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

The network 116 is a conventional type of network, wired or wireless, and may have any number of configurations such as a star configuration, token ring configuration or other configurations known to those skilled in the art. In one embodiment, the network 116 comprises one or more of a local area network (LAN), a wide area network (WAN) (e.g., the Internet), and/or any other interconnected data path across which multiple devices communicate. In another embodiment, the network 116 is a peer-to-peer network. The network 116 is coupled to or includes portions of a telecommunications network for sending data in a variety of different communication protocols. For example, the network is a 3G network or a 4G network. In yet another embodiment, the network 116 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 116 are encrypted using conventional encryption technologies such as secure sockets layer (SSL), secure HTTP and/or virtual private networks (VPNs).

The external system 118 is a system that communicates with the control unit 102 via a network 116. The control unit 102 retrieves information (e.g., log information) from the storage device 114 and sends the information to the external system 118 via the network 116. In one embodiment, the external system 118 includes a database storing the information received from the control units 102 embedded in a plurality of automobiles. In another embodiment, the external system 118 includes a storage device that serves as a backup for the storage 114. In other embodiments, the external system 118 processes the received information to generate one or more reports. For example, the external system 118 aggregates the log information associated with a type of errors and generates a report describing the aggregation of the errors to an administrator of the external system 118.

Fault-Tolerant Processor

Figure 2:
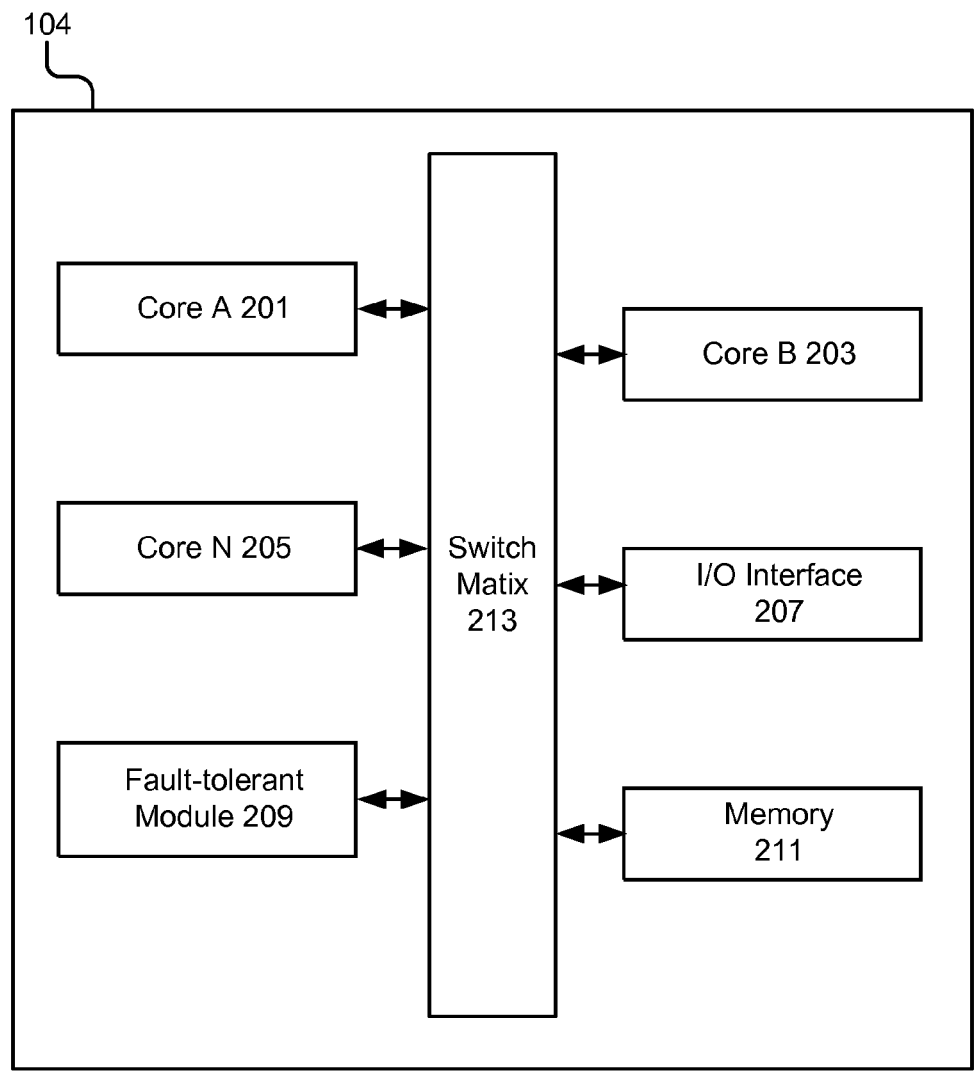
FIG. 2 is a block diagram illustrating one embodiment of a fault-tolerant processor.

FIG. 2 is a block diagram illustrating a fault-tolerant processor 104 according to one embodiment. The processor 104 includes, among other things, a core A 201, a core B 203, a core N 205, an I/O interface 207, a fault-tolerant module 209, a memory 211 and a switch matrix 213. The core A 201, core B 203 and core N 205 are illustrated by way of examples. One skilled in the art will recognize that the processor 104 may include any number of cores. One skilled in the art will also appreciate that additional components can be included in the processor 104 such as firmware, digital logic and on-chip storages, etc.

Figure 4A:
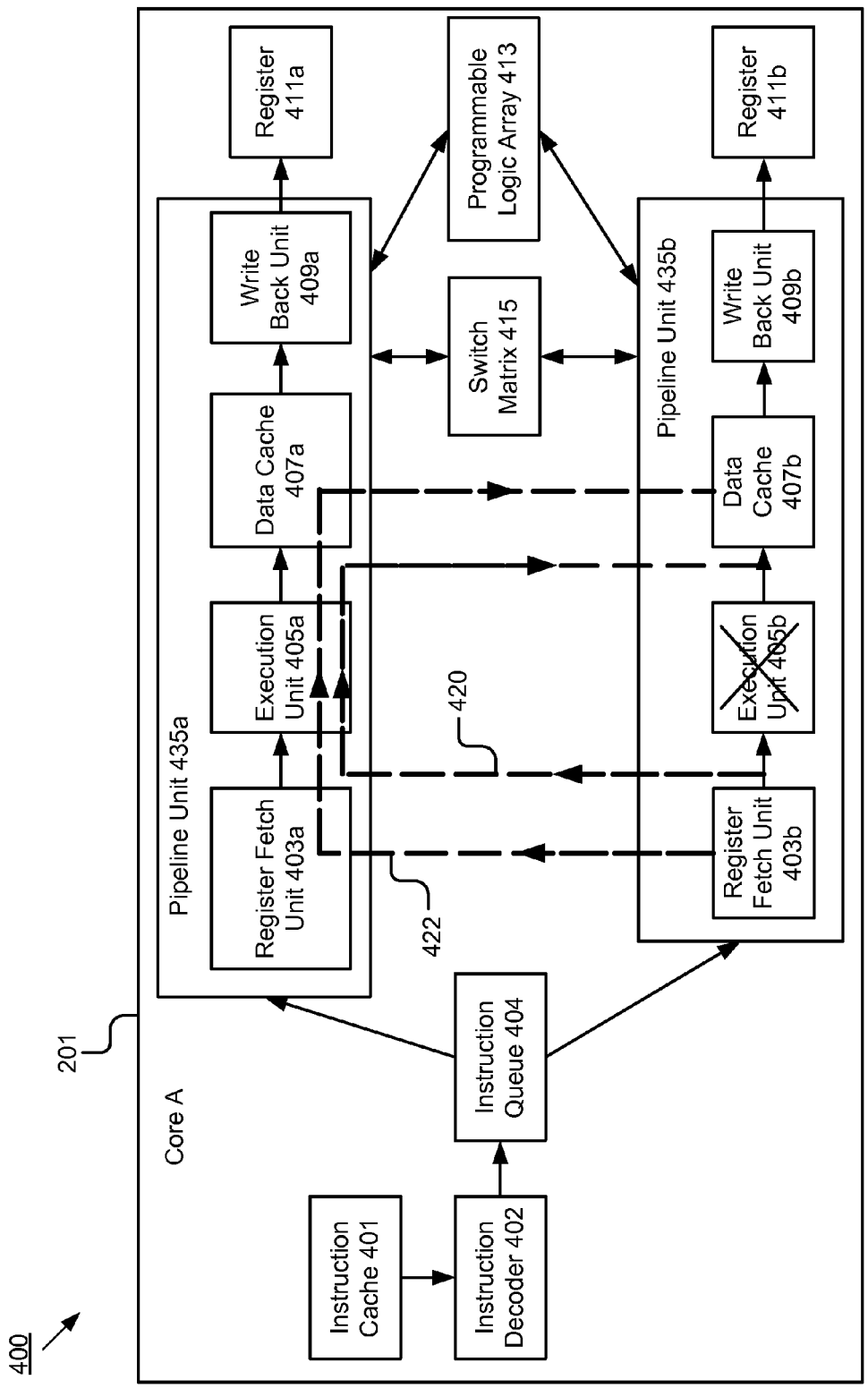
FIG. 4A is a block diagram illustrating one embodiment of a fallback between two pipeline units in a core.

The core A 201 is a device that reads and executes instructions for a computer program. For example, the core A 201 is a conventional core of a conventional processor in a computer. An example of a block diagram for the core A 201 is shown in FIG. 4A. In one embodiment, the core A 201 includes a plurality of functional units for processing instructions such as reading, executing and storing the instructions. A functional unit is a unit for performing a function in a core. For example, a functional unit is an electronic circuit for storing an instruction in a core. In one embodiment, a functional unit is one of a pipeline unit, an instruction cache, an instruction decoder, an instruction queue, a programmable logic array, a switch matrix and a register, etc. The instruction cache, the instruction decoder, the instruction queue, the programmable logic array and the register are described below with reference to FIG. 4A.

A pipeline unit is a functional unit in a core that executes an instruction using one or more pipeline stages. A pipeline stage is a stage of a process for executing an instruction. For example, a pipeline stage is one of fetching an instruction, executing an instruction, buffering an instruction-execution result and writing back an instruction-execution result to a register. In one embodiment, a pipeline unit includes one or more stage units for performing one or more pipeline stage. For example, a pipeline unit includes one or more stage units such as a register fetch unit, an execution unit, a data cache and a write-back unit. The pipeline unit uses a register fetch unit to fetch an instruction from an instruction queue, an execution unit to execute an instruction, a data cache to buffer an instruction-execution result and a write back unit to store an instruction-execution result in a register. The register fetch unit, execution unit, data cache and write back unit are described below in more detail with reference to FIG. 4A.

A stage unit is a unit that implements a pipeline stage. For example, a register fetch unit performs a pipeline stage of fetching an instruction. An execution unit performs a pipeline stage of executing an instruction. A data cache performs a pipeline stage of buffering an instruction-execution result. A write back unit performs a pipeline stage of writing back an instruction-execution result to a register.

In one embodiment, the core A 201 is implemented using pipelining techniques. A pipelining technique is a technique to separate an execution process for an instruction into one or more pipeline stages. For example, the core A 201 includes a pipeline unit that separates an execution process for an instruction into four sequential pipeline stages (e.g., fetching an instruction, executing the instruction, buffering an instruction-execution result and writing back the instruction-execution result to a register). The pipeline unit executes an instruction by performing the four pipeline stages sequentially for the instruction.

The pipelining techniques enable a single pipeline unit in a core to process a plurality of instructions simultaneously. For example, while a register fetch unit of a pipeline unit fetches a first instruction from an instruction queue, an execution unit of the pipeline unit executes a second instruction, a data cache of the pipeline unit buffers an instruction-execution result for a third instruction and a write back unit of the pipeline unit writes an instruction-execution result for a fourth instruction to a register.

In another embodiment, the core A 201 is implemented using a superscalar architecture. A superscalar architecture is an architecture that allows a core to execute instructions in parallel. For example, the core A 201 having a superscalar architecture includes more than two instruction-execution units and processes the instructions in parallel by executing different instructions in each of the instruction-execution units simultaneously. As a further example, the core A 201 includes two instruction-execution units and executes a first instruction in a first instruction-execution unit and a second instruction in a second instruction-execution unit. An instruction-execution unit is a functional unit for processing an instruction. For example, an instruction-execution unit is a pipeline unit. One skilled in the art will recognize that a core A 201 may include any number of instruction-execution units to process any number of instructions in parallel.

In yet another embodiment, the core A 201 is implemented using a superscalar architecture and pipelining techniques. The core A 201 is therefore referred to as a superscalar pipeline core. For example, the core A 201 includes a plurality of pipeline units. The plurality of pipeline units is configured to process different instructions in parallel and each pipeline unit is also configured to process instructions using the pipelining techniques described above. For example, a first pipeline unit is configured to process a first set of instructions using the pipelining techniques. Simultaneously, a second pipeline unit is configured to process a second set of instructions using the pipelining techniques. One skilled in the art will recognize that the core A 201 may include any number of pipeline units with each pipeline unit processing instructions using the pipelining techniques. The core A 201 is described further with reference to FIG. 4A.

It is beneficial to implement a core using a superscalar architecture and pipelining techniques because, among other things, this implementation increases instruction throughput (i.e., the number of instructions that are executed in a unit of time). Additionally, this implementation also reduces the overhead time for providing a fault-tolerant basis to execute instructions in the system 100. For example, if an error occurs when executing an instruction in a first pipeline unit of a core, the execution of the instruction is recovered by executing the instruction in a second pipeline unit in the same core without resorting to additional sources outside the core.

The core B 203 and the core N 205 are units similar to the core A 201 and provide similar functionality as the core A 201. The descriptions for the core B 203 and the core N 205 will not be repeated here. It is particularly advantageous to implement a plurality of cores in the processor 104 because, among other things, it increases instruction throughput of the processor 104 by executing instructions in parallel in the plurality of cores. Additionally, the plurality of cores provides additional fault tolerance to the execution of instructions. For example, if an error occurs when an instruction is executed in a first pipeline unit of a first core, the instruction may be transferred to execute in a second pipeline unit of a second core without interruption.

The I/O interface 207 is a device that handles communication between the processor 104 and one or more I/O devices. For example, the I/O interface 207 is an electronic circuit that sends data to and/or receives data from one or more I/O devices. An I/O device is a peripheral device such as a keyboard, display, etc. In one embodiment, the I/O interface 207 interprets an address for a peripheral device, implements handshaking with the peripheral device using handshaking commands and sets up communications between components of the processor 104 and the peripheral device. In one embodiment, the I/O interface 207 is comprised within the interface 106.

The fault-tolerant module 209 is code and routines for providing fault-tolerant functionality to the processor 104. For example, the fault-tolerant module 209 detects errors when instructions are executed in one or more cores of the processor 104 and recovers the execution of the instructions from errors by providing the fault-tolerant functionality described below.

In one embodiment, a first error is detected when an instruction is executed in a stage unit (e.g., an execution unit) of a first pipeline unit in a first core. A stage unit that incurs an error in an instruction-execution process is referred to as "a faulty stage unit" of a pipeline unit. Other stage units that do not incur any errors are referred to as "non-faulty stage units" of the pipeline unit. In one embodiment, a faulty stage unit fails partially. For example, only one or more components of the faulty stage unit malfunction and cause an error. In another embodiment, a faulty stage unit fails completely. For example, every component in the faulty stage unit malfunctions. Responsive to detecting the first error, the fault-tolerant module 209 rewrites the instruction to generate a rewritten instruction. The fault-tolerant module 209 executes the rewritten instruction in the first pipeline unit of the first core.

For example, assume that an error is detected when an instruction is executed in an execution unit of a pipeline unit. The pipeline unit includes a register fetch unit, the execution unit, a data cache and a write back unit. The execution unit is a faulty stage unit in which the error occurs. The register fetch unit, the data cache and the write back unit are non-faulty stage units. The fault-tolerant module 209 rewrites the instruction to form a rewritten instruction and executes the rewritten instruction in the first pipeline unit that includes the faulty stage unit and other non-faulty stage units.

If a second error is detected when the rewritten instruction is executed, the fault-tolerant module 209 selects a first substitute stage unit from a second pipeline unit of the first core for the faulty stage unit. A substitute stage unit is a stage unit serving as a substitute for a faulty stage unit and replacing the faulty stage unit to perform a pipeline stage for an instruction. For example, if a faulty stage unit is an execution unit in a first pipeline unit, a substitute stage unit for the faulty stage unit is an execution unit in a second pipeline unit. The fault-tolerant module 209 re-executes the instruction in the non-faulty stage units of the first pipeline unit and the first substitute stage unit of a second pipeline unit in the first core.

If a third error is detected when the instruction is re-executed in the first substitute stage unit of the second pipeline unit in the first core, the fault-tolerant module 209 selects a second substitute stage unit from a third pipeline unit of a second core for the faulty stage unit. The fault-tolerant module 209 re-executes the instruction in the non-faulty stage units of the first pipeline unit in the first core and the second substitute stage unit of the third pipeline unit in the second core.

If a fourth error is detected when the instruction is re-executed in the second substitute stage unit of the third pipeline unit in the second core, the fault-tolerant module 209 re-executes the instruction in the third pipeline unit of the second core without using any non-faulty stage units of the first pipeline unit in the first core.

In one embodiment, the fault-tolerant module 209 locates a faulty component in the faulty stage unit and establishes a fallback unit for the faulty component using a programmable logic array. A fallback unit is a functional unit that performs functionality similar to a faulty component. For example, a faulty component is a multiplier and a fallback unit for the faulty component performs the functionality of a multiplier. After establishing a fallback unit for a faulty component in a faulty stage unit, the fault-tolerant module 209 continues to execute next instructions in the pipeline unit that includes the faulty stage unit by replacing the faulty component with the fallback unit. The fault-tolerant module 209 is described below in more detail with reference to FIG. 3.

The memory 211 is a non-transitory computer-readable memory that stores instructions and/or data executable by one or more cores such as the core A 201, core B 203 and core N 205 of the processor 104. In one embodiment, the memory 211 includes various non-volatile on-chip storage devices. The storage devices include, but are not limited to: L2/L3 caches; instruction caches; data cache units; and register files. The storage units will be collectively referred to herein as "on-chip storage."

The switch matrix 213 is a device for switching the execution of an instruction from a first core to a second core. For example, the switch matrix 213 is an electronic circuit for routing data arbitrarily among the core A 201, core B 203 and the core N 205. For a further example, when an error is detected in an execution process of an instruction in the core A 201, the switch matrix 213 switches the execution of the instruction from the core A 201 to the core B 203. In one embodiment, the switch matrix 213 also includes a bus for communicating data and/or signals between components of the processor 104 (e.g., the I/O interface 207, the core A 201, etc.). The components of the processor 104 are communicatively coupled to each other via the bus.

Fault-Tolerant Module

Figure 3:
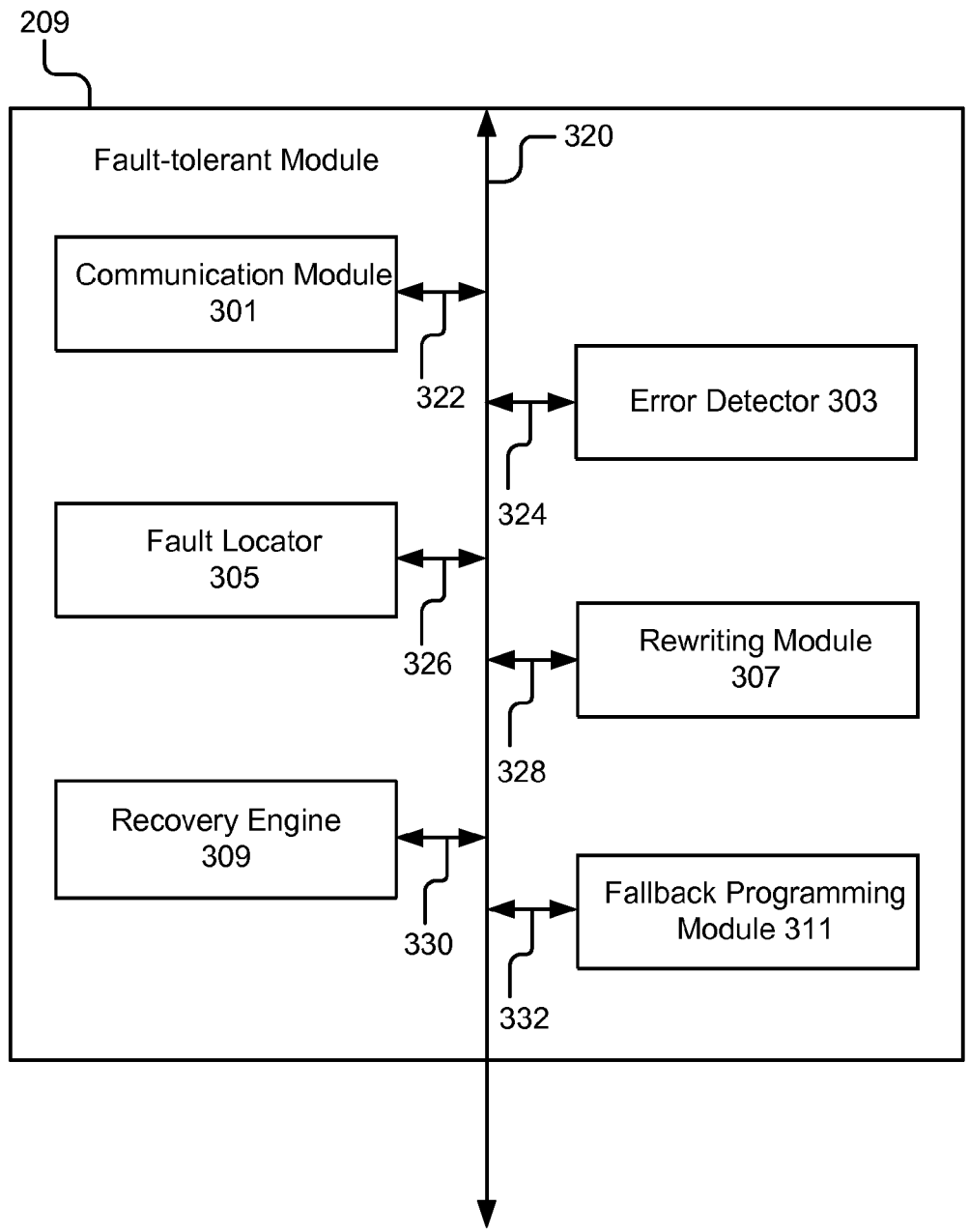
FIG. 3 is a block diagram illustrating one embodiment of a fault-tolerant module.

Referring now to FIG. 3, the fault-tolerant module 209 is shown in more detail. FIG. 3 is a block diagram illustrating the fault-tolerant module 209 according to one embodiment. The fault-tolerant module 209 comprises a communication module 301, an error detector 303, a fault locator 305, a rewriting module 307, a recovery engine 309 and a fallback programming module 311. These components of the fault-tolerant module 209 are communicatively coupled to each other via a bus 320. In one embodiment, the bus 320 is included in the switch matrix 213.

The communication module 301 is code and routines for handling communication among the components of the fault-tolerant module 209 and other components of the processor 104. For example, the communication module 301 receives data and/or information from other components of the fault-tolerant module 209 (e.g., a command from the recovery engine 309) and sends the data and/or information to one or more cores (e.g., the core A 201, core B 203, etc.) of the processor 104. In one embodiment, the communication module 301 is stored in the processor's 104 on-chip storage (e.g., the memory 211). The communication module 301 is communicatively coupled to the bus 320 via signal line 322.

In one embodiment, the communication module 301 receives data and/or information from the one or more cores of the processor 104 and sends the data and/or information to other components of the fault-tolerant module 209. In another embodiment, the communication module 301 also handles communication between components of the fault-tolerant module 209. For example, the communication module 301 communicates with the error detector 303 and the rewriting module 307 to deliver the error signal generated by the error detector 303 to the rewriting module 307.

The error detector 303 is code and routines for monitoring a process of executing an instruction and detecting any errors that occur in the process. For example, the error detector 303 monitors execution of instructions in a core A 201 and determines whether any error occurs during the execution of instructions. In one embodiment, the error detector 303 is stored in the processor's 104 on-chip storage (e.g., the memory 211). The error detector 303 is communicatively coupled to the bus 320 via signal line 324.

In one embodiment, the error detector 303 detects an error when an instruction is executed in a pipeline unit of a core (e.g., the core A 201, core B 203, etc.). The error detector 303 determines a faulty stage unit in which the error occurs. As described above, a stage unit in which the error occurs is referred to as a faulty stage unit and other stage units in the pipeline unit are referred to as non-faulty stage units. For example, the error detector 303 detects an error that occurred when an instruction is executed in an execution unit of a pipeline unit in a core A 201 and determines that the faulty stage unit is the execution unit. In one embodiment, the error detector 303 detects an error using error detecting methods such as error detection codes, signature data, instruction execution repeat, hash functions, etc. One skilled in the art will recognize that the error detector 303 may apply other error detection techniques to detect errors.

In one embodiment, the error detector 303 detects a plurality of errors associated with an instruction when the instruction is re-executed multiple times. For example, the error detector 303 detects a first error when the instruction is executed in a first pipeline unit of a core, a second error when the instruction is re-executed in a second pipeline unit of the core and a third error when the instruction is re-executed in a third pipeline unit of another core. One skilled in the art will recognize that the error detector 303 may detect any number of errors associated with the instruction if the errors occur. In one embodiment, the error detector 303 includes an error counter for counting the number of errors that have occurred when processing an instruction. For example, the error counter having a value of two indicates that two errors have been detected when executing the instruction twice.

In one embodiment, the error detector 303 generates an error signal as an output when detecting an error. The error signal indicates that an error has been detected when an instruction is executed in a faulty stage unit of a pipeline unit in a core. In one embodiment, the error signal includes one or more of an identifier of the error, an identifier of the faulty stage unit, an identifier of the pipeline unit and an identifier of the core. For example, if the error detector 303 detects an error when an instruction is executed in an execution unit of a pipeline unit in the core A 201, the error detector 303 generates an error signal including an identifier of the error, an identifier of the faulty stage unit (e.g., the execution unit), an identifier of the pipeline unit and an identifier of the core A 201. In one embodiment, the error signal also includes a value for the error counter. In one embodiment, the error detector 303 outputs the error signal to one or more of the fault locator 305, the rewriting module 307 and the recovery engine 309.

The fault locator 305 is code and routines for locating a faulty component of a pipeline unit. A faulty component of a pipeline unit is a component of a faulty stage unit in the pipeline unit that incurs the error. For example, the fault locator 305 identifies a faulty component of the pipeline unit as a multiplier of a faulty stage unit (e.g., an execution unit) in the pipeline unit because the error is incurred by the multiplier. In one embodiment, the fault locator 305 is stored in the processor's 104 on-chip storage. The fault locator 305 is communicatively coupled to the bus 320 via signal line 326. In one embodiment, the fault locator 305 parses an error signal received from the error detector 303 and extracts one or more of an identifier of a faulty stage unit, an identifier of a pipeline unit and an identifier of a core from the error signal.

In one embodiment, the fault locator 305 locates the faulty component of the pipeline unit using a model-based technique. Examples of the model-based technique include, but are not limited to: observer-based approach; parity-space approach; and parameter identification based methods. In another embodiment, the fault locator 305 locates the faulty component of the pipeline unit using a built-in self-test (BIST). One skilled in the art will recognize that other techniques to locate a faulty component of the pipeline unit are possible. One skilled the art will also appreciate that the fault locator 305 may locate any number of faulty components in a pipeline unit.

In one embodiment, the fault locator 305 outputs an identifier of the faulty component of the pipeline unit to the fallback programming module 311. For example, the fault locator 305 sends an identifier identifying a faulty multiplier in an execution unit of a pipeline unit in a core to the fallback programming module 311.

The rewriting module 307 is code and routines for rewriting an instruction to generate a rewritten instruction. The instruction and the rewritten instruction are instructions in different forms for performing the same operation. For example, the instruction is a "multiply" instruction and is rewritten to form a rewritten instruction that includes a combination of additions and shift operations to perform a multiplication operation. In one embodiment, the rewriting module 307 rewrites an instruction to generate a rewritten instruction when an error signal is received from the error detector 303. In another embodiment, the rewriting module 307 rewrites the instruction to form a rewritten instruction when a rewriting command is received from the recovery engine 309. The recovery engine 309 is described below in more detail.

The rationale to rewrite an instruction and generate a rewritten instruction for the instruction is that the instruction and the rewritten instruction may be processed by different components of a pipeline unit. If an error is incurred by a faulty component in a pipeline unit, the error may be avoided by processing a rewritten instruction because the rewritten instruction is processed by a different component rather than the faulty component. For example, an error incurred by a multiplier is avoided by rewriting a "multiply" instruction to a rewritten instruction including a combination of additions and shift operations. The rewritten instruction is processed by an adder that performs additions and a bit shifter that performs shift operations so that the faulty multiplier is not used in the instruction execution. By rewriting the instruction and processing the rewritten instruction, the system 100 is able to recover from an error incurred by a faulty component with minimal overhead time because the rewritten instruction is still processed by the same pipeline unit in the same core without resorting to additional resources.

In one embodiment, the rewriting module 307 is stored in the processor's 104 on-chip storage. The rewriting module 307 is communicatively coupled to the bus 320 via signal line 328. In one embodiment, the rewriting module 307 outputs the rewritten instruction to the recovery engine 309 via the bus 320.

The recovery engine 309 is code and routines for recovering execution of instructions from one or more errors. For example, the recovery engine 309 receives an error signal from the error detector 303 and recovers execution of an instruction from an error as described below. In one embodiment, the recovery engine 309 includes an error counter for counting the number of errors associated with an instruction similar to an error counter included in the error detector 303 described above. For example, a value of the error counter indicates that two errors occur when executing the instruction twice. In one embodiment, the recovery engine 309 updates the value for the error counter based at least in part on a value stored in an error counter of the error detector 303. In one embodiment, the recovery engine 309 is stored in the processor's 104 on-chip storage. The recovery engine 309 is communicatively coupled to the bus 320 via signal line 330.

The recovery engine 309 is described below by way of examples. In the examples, the recovery engine 309 provides fault tolerance for executing instructions in a first core and a second core. The first core includes a first pipeline unit and a second pipeline unit. The second core includes a third pipeline unit and a fourth pipeline unit. One skilled in the art will recognize that the recovery engine 309 may provide fault tolerance to any number of cores that include any number of pipeline units.

In one embodiment, the recovery engine 309 receives a first error signal from the error detector 303 indicating that a first error occurs when executing an instruction in a faulty stage unit of the first pipeline unit in the first core. It is the first time that the instruction is executed. The recovery engine 309 retrieves an identifier of the faulty stage unit from the error signal. The recovery engine 309 re-executes the instruction in the first pipeline unit of the first core. For example, the recovery engine 309 generates a command and sends the command to the first core, causing the first core to re-execute the instruction in the faulty stage unit and other non-faulty stage units of the first pipeline unit in the first core. This re-execution of the instruction in the same pipeline unit of the same core recovers the execution of the instruction from transient errors that occur temporarily and are not incurred by any hardware defects. In one embodiment, if no other error signals are received when re-executing the instruction in the first pipeline unit of the first core, the recovery engine 309 continues to execute next instructions in the first pipeline unit of the first core. For example, the recovery engine 309 generates a command and sends the command to the first core, causing the first core to execute the next instructions in the first pipeline unit.

In one embodiment, the recovery engine 309 receives a second error signal from the error detector 303 indicating that a second error occurs when re-executing the instruction in the faulty stage unit of the first pipeline unit in the first core. The recovery engine 309 generates a rewritten command and sends the rewritten command to the rewriting module 307. The rewritten command instructs the rewriting module 307 to rewrite the instruction and generate a rewritten instruction. The recovery engine 309 receives the rewritten instruction from the rewriting module 307 and executes the rewritten instruction in the first pipeline unit of the first core. For example, the recovery engine 309 generates a command and sends the command to the first core, causing the first core to execute the rewritten instruction in the faulty stage unit and other non-faulty stage units of the first pipeline unit. This execution of the rewritten instruction recovers the execution of the instruction from errors incurred by a partial failure of a faulty stage unit. For example, the execution of a rewritten instruction for a "multiply" instruction recovers the execution of the instruction from errors incurred by a faulty multiplier of the execution unit.

In one embodiment, if no other error signals are received when executing the rewritten instruction in the first pipeline unit, the recovery engine 309 continues to execute next instructions in the first pipeline unit of the first core. For example, the recovery engine 309 instructs the rewriting module 307 to rewrite the next instructions and generate rewritten instructions. The recovery engine 309 executes the rewritten instructions for the next instructions in the first pipeline unit of the first core. The recovery engine 309 also sends an identifier of the faulty stage unit to the fault locator 305 so that the fault locator 305 locates a faulty component in the faulty stage unit that incurs the error.

In one embodiment, the recovery engine 309 receives a third error signal from the error detector 303 indicating that a third error occurs when executing the rewritten instruction in the faulty stage unit of the first pipeline unit. The recovery engine 309 selects a first substitute stage unit for the faulty stage unit from the second pipeline unit in the first core. For example, if a faulty stage unit is an execution unit in the first pipeline unit of the first core, the recovery engine 309 selects an execution unit in the second pipeline unit of the first core as a first substitute stage unit for the faulty stage unit. In one embodiment, the recovery engine 309 determines whether the instruction executed in the first pipeline unit has a higher priority than instructions executed in the second pipeline unit of the first core. If the instruction executed in the first pipeline unit has a higher priority, the recovery engine 309 selects a first substitute stage unit from the second pipeline unit in the first core. Otherwise, the recovery engine 309 selects a first substitute stage unit for the faulty stage unit from other pipeline units in the first core.

The recovery engine 309 re-executes the instruction using the first substitute stage unit in the second pipeline unit and other non-faulty stage units in the first pipeline unit of the first core. For example, assume a faulty stage unit is an execution unit in the first pipeline unit of the first core. The recovery engine 309 generates a command and sends the command to the first core, causing the first core to re-execute the instruction in the non-faulty stage units (e.g., a register fetch unit, a data cache, a write back unit, etc.) of the first pipeline unit and the first substitute stage unit (e.g., an execution unit) of the second pipeline unit in the first core. An example of this re-execution of the instruction using a substitute stage unit from a different pipeline unit in the same core is illustrated in FIG. 4A.

In one embodiment, if no other error signals are received when re-executing the instruction using the first substitute stage unit of the second pipeline unit and other non-faulty stage units of the first pipeline unit in the first core, the recovery engine 309 continues to execute next instructions. For example, the recovery engine 309 executes the next instructions using the first substitute stage unit of the second pipeline unit and other non-faulty stage units of the first pipeline unit in the first core. The recovery engine 309 also sends an identifier of the faulty stage unit to the faulty locator 305 so that the faulty locator 305 locates a faulty component in the faulty stage unit that incurs the error.

In one embodiment, the recovery engine 309 receives a fourth error signal from the error detector 303 indicating that a fourth error occurred when re-executing the instruction in the first substitute stage unit of the second pipeline unit and other non-faulty stage units of the first pipeline unit in the first core. The recovery engine 309 selects a second substitute stage unit for the faulty stage unit from a third pipeline unit in a second core. For example, if a faulty stage unit is an execution unit in the first pipeline unit of the first core, the recovery engine 309 selects an execution unit in the third pipeline unit of the second core as a second substitute stage unit for the faulty stage unit. In one embodiment, the recovery engine 309 determines whether the instruction executed in the first pipeline unit has a higher priority than instructions executed in the third pipeline unit of the second core. If the instruction executed in the first pipeline unit has a higher priority, the recovery engine 309 selects a second substitute stage unit for the faulty stage unit from the third pipeline unit in the second core. Otherwise, the recovery engine 309 selects a second substitute stage unit from other pipeline units in the second core.

Figure 4B:
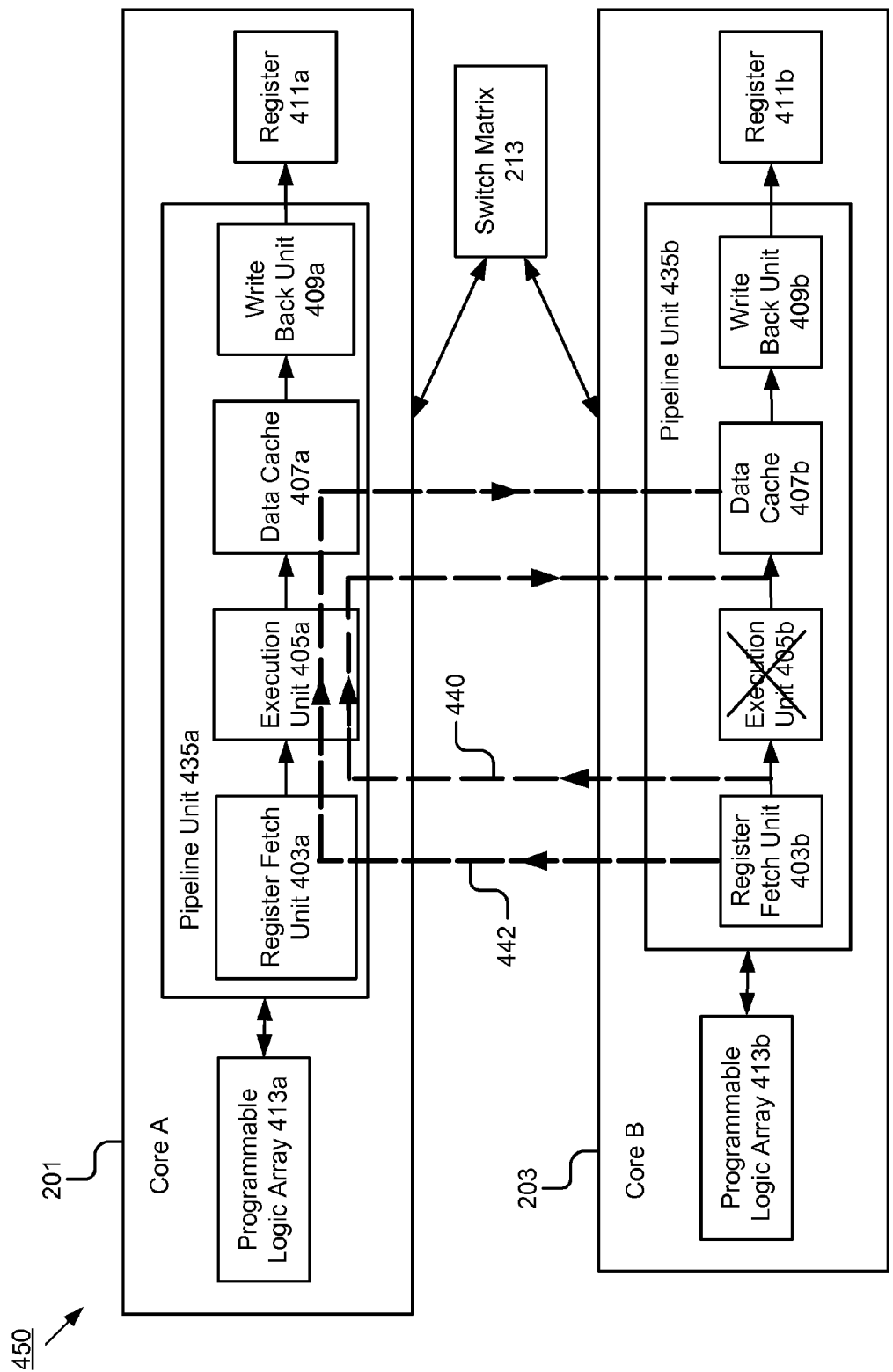
FIG. 4B is a block diagram illustrating one embodiment of a fallback between a first pipeline unit in a first core and a second pipeline unit in a second core.

The recovery engine 309 re-executes the instruction using the second substitute stage unit of the third pipeline unit in the second core and other non-faulty stage units of the first pipeline unit in the first core. For example, assume a faulty stage unit is an execution unit in a first pipeline unit of a first core. The recovery engine 309 generates a command and sends the command to the first core and the second core, causing the cores to re-execute the instruction in the non-faulty stage units (e.g., a register fetch unit, a data cache, a write back unit, etc.) of the first pipeline unit in the first core and the second substitute stage unit (e.g., an execution unit) of the third pipeline unit in the second core. An example of this re-execution of the instruction using a substitute stage unit from a different pipeline unit in another core is illustrated in FIG. 4B.

In one embodiment, if no other error signals are received when re-executing the instruction using the second substitute stage unit of the third pipeline unit in the second core and other non-faulty stage units of the first pipeline unit in the first core, the recovery engine 309 continues to execute next instructions. For example, the recovery engine 309 executes the next instructions using the second substitute stage unit of the third pipeline unit in the second core and other non-faulty stage units of the first pipeline unit in the first core. The recovery engine 309 also sends an identifier of the faulty stage unit to the fault locator 305 so that the fault locator 305 locates a faulty component in the faulty stage unit that incurs the error.

In one embodiment, the recovery engine 309 receives a fifth error signal from the error detector 303 indicating that a fifth error occurs when re-executing the instruction in the second substitute stage unit of the third pipeline unit in the second core and other non-faulty stage units of the first pipeline unit in the first core. The recovery engine 309 re-executes the instruction using one or more of the stage units in the third pipeline unit of the second core without applying any stage units in the first core. For example, if an error occurs when re-executing the instruction in an execution unit of the third pipeline unit of the second core, the recovery engine 309 re-executes the instruction using one or more of the stage units of the third pipeline unit in the second core to perform the pipeline stages of "fetching an instruction," "executing an instruction," "buffering an instruction-execution result" and "writing back an instruction-execution result," etc. In one embodiment, the recovery engine 309 determines whether the instruction executed in the first pipeline unit has a higher priority than instructions executed in the third pipeline unit of the second core. If the instruction executed in the first pipeline unit has a higher priority, the recovery engine 309 re-executes the instruction using one or more of the stage units in the third pipeline unit of the second core.

In one embodiment, if no other error signals are received when re-executing the instruction using the third pipeline unit of the second core, the recovery engine 309 continues to execute next instructions. For example, the recovery engine 309 executes the next instructions using the third pipeline unit in the second core. The recovery engine 309 sends an identifier of the faulty stage unit to the fault locator 305 so that the fault locator 305 locates a faulty component in the faulty stage unit that incurs the error.

The above-described functionality performed by the recovery engine 309 for recovering execution of instructions from errors is referred to as a hierarchical scheduling method. The hierarchical scheduling method provides a fault-tolerant basis for executing instructions in one or more cores. The hierarchical scheduling method is advantageous because, among other things, it reduces the overhead time for recovering the execution of instructions from errors by trying to re-execute the instruction using sources as close to the faulty stage unit as possible. For example, as described above, the recovery engine 309 first selects a substitute stage unit from a different pipeline unit of the same core. Only when the re-execution of the instruction fails again, the recovery engine 309 selects another substitute stage unit from a pipeline unit in a different core.

In one embodiment, the recovery engine 309 provides fault tolerance for executing instructions in one or more cores based at least in part on the above hierarchical scheduling method. However, in other embodiments, the recovery engine 309 provides the fault tolerance for executing instructions in the one or more cores using other methods. For example, as long as an error is detected when an instruction is executed in a first pipeline unit of a first core, the recovery engine 309 re-executes the instruction in a second pipeline unit of a second core immediately without following steps in the hierarchical scheduling method.

In one embodiment, the recovery engine 309 generates log information that describes one or more detected errors and a faulty stage unit for which an error is detected. In one embodiment, the recovery engine 309 stores the log information in the storage 114. In another embodiment, the recovery engine 309 stores the log information in the external system 118.

The fallback programming module 311 is code and routines for establishing a fallback unit for a faulty component of a pipeline unit. In one embodiment, the fallback programming module 311 is stored in the processor's 104 on-chip storage. The fallback programming module 311 is communicatively coupled to the bus 320 via signal line 332. In one embodiment, the fallback programming module 311 receives an identifier for a faulty component of a pipeline unit from the fault locator 305. The fallback programming module 311 configures one or more programmable logic arrays (PLA if singular, PLAs if plural) to implement the functionality of the faulty component of the pipeline unit, so that a new instruction processing path is established by replacing the faulty component of the pipeline unit using the one or more PLAs.

For example, the fallback programming module 311 receives an identifier identifying a faulty multiplier in an execution unit of a pipeline unit in a core A 201. The fallback programming module 311 programs a PLA to implement the functionality of a multiplier and uses the PLA to replace the faulty multiplier when executing instructions in the pipeline unit in the core A 201. The new instruction processing path for executing the instructions includes the faulty stage unit with the faulty component replaced by the PLA and other non-faulty stage units of the pipeline unit in the core A 201. The PLA is described below in more detail with reference to FIG. 4A.

In one embodiment, the fallback programming module 311 records log information including the identifier for the faulty component of the pipeline unit and the instruction processing path. In one embodiment, the fallback programming module 311 stores the log information to the storage 114. In another embodiment, the fallback programming module 311 stores the log information in the external system 118.

Fault Tolerance Examples

FIG. 4A is a block diagram 400 illustrating a fallback between two pipeline units in a core A 201 according to one embodiment. In the illustrated embodiment, the core A 201 comprises, among other things, an instruction cache 401, an instruction decoder 402, an instruction queue 404, a register 411a, a register 411b, a programmable logic array (PLA) 413, a switch matrix 415, a pipeline unit 435a and a pipeline unit 435b. Although only two pipeline units 435a and 435b are illustrated in FIG. 4A, one skilled in the art will recognize that the core A 201 may include any number of pipeline units.

The instruction cache 401 is a functional unit for storing instructions. For example, the instruction cache 401 is a conventional cache embedded in a core for temporarily storing instructions. In one embodiment, instructions are fetched from a memory 211 and stored in the instruction cache 401 to speed up the processing of instructions.

The instruction decoder 402 is a functional unit for decoding instructions. For example, the instruction decoder 402 is an electronic circuit that decodes instructions. In one embodiment, the instruction decoder 402 receives an instruction from the instruction cache 401, decodes the instruction into a form executable by the core A 201 and sends the decoded instruction to the instruction queue 404.

The instruction queue 404 is a functional unit for storing decoded instructions. For example, the instruction queue 404 is a conventional cache included in a core that stores the decoded instructions temporarily. In one embodiment, the instruction queue 404 receives one or more instructions from the instruction decoder 402 and stores the one or more instructions in a queue.

In one embodiment, the pipeline unit 435a comprises one or more stage units such as a register fetch unit 403a, an execution unit 405a, a data cache 407a, and a write back unit 409a.

The register fetch unit 403a is a stage unit for fetching an instruction. For example, the register fetch unit 403a is an electronic circuit for performing a pipeline stage of "fetching an instruction." In one embodiment, the register fetch unit 403a fetches an instruction from the instruction queue 404 and stores the instruction temporarily.

The execution unit 405a is a stage unit for executing an instruction. For example, the execution unit 405 is an electronic circuit for performing a pipeline stage of "executing an instruction." In one embodiment, the execution unit 405a includes one or more functional units for performing one or more mathematical functions (e.g., summing, subtracting, multiplying, etc.) and/or one or more logical functions (e.g., AND, OR, NAND, NOR, etc.). For example, the execution unit 405a includes a multiplier, an adder, a bit shifter and other components for performing the mathematical and logical functions. In one embodiment, the execution unit 405a includes an arithmetic logic unit (ALU). In one embodiment, the execution unit 405a retrieves an instruction from the register fetch unit 403a, executes the instruction to generate an instruction-execution result and sends the instruction-execution result to the data cache 407a.

The data cache 407a is a stage unit for storing an instruction-execution result temporarily. For example, the data cache 407a is a conventional cache embedded in a core for performing a pipeline stage of "buffering an instruction-execution result." In one embodiment, the data cache 407a receives an instruction-execution result from the execution unit 405a and stores the instruction-execution result temporarily.

The write back unit 409a is a stage unit for writing an instruction-execution result to a register. For example, the write back unit 409a is a functional unit for performing a pipeline stage of "writing back an instruction-execution result to a register." In one embodiment, the write back unit 409a retrieves an instruction-execution result from the data cache 407a and writes the instruction-execution result to the register 411a.

In the illustrated embodiment, the pipeline unit 435b has similar elements and performs similar functionality as the pipeline unit 435a. The pipeline unit 435b includes, among other things, a register fetch unit 403b, an execution unit 405b, a data cache 407b and a write back unit 409b. Like reference numerals are used to refer to similar elements. The descriptions for the register fetch unit 403b, the execution unit 405b, the data cache 407b and the write back unit 409b will not be repeated here.

The register 411a is a functional unit for storing an instruction-execution result. For example, the register 411a is a conventional register included in a core. In one embodiment, the register 411a stores the instruction-execution result in the memory 211. The register 411b has similar structures and performs similar functionality as the register 411a. The descriptions for the register 411b will not be repeated here.

The PLA 413 is a functional unit for implementing the functionality of a faulty component in a pipeline unit. For example, the PLA 413 is a field-programmable gate array (FPGA) that is configurable to implement the functionality of a faulty component in a pipeline unit 435a, 435b. In one embodiment, the PLA 413 replaces the faulty component in pipeline unit 435a, 435b when an instruction is processed in the pipeline unit 435a, 435b.

The switch matrix 415 is a device for switching execution of an instruction from a first pipeline unit to a second pipeline unit in a core. For example, the switch matrix 415 is an electronic circuit for routing data arbitrarily between the pipeline unit 435a and the pipeline unit 435b. In one embodiment, when an error is detected in the execution of an instruction in a first pipeline unit of a core, the switch matrix 415 switches the execution of the instruction from the first pipeline unit to a second pipeline unit of the same core as described below.

As illustrated in FIG. 4A, the pipeline units 435a and 435b process instructions in parallel. For example, while the pipeline unit 435a is processing a first set of instructions, the pipeline unit 435b is able to process a second set of instructions in parallel to the pipeline unit 435a. Each of the pipeline units 435a and 435b also employs pipelining techniques to process the instructions using pipeline stages such as fetching an instruction, executing an instruction, buffering an instruction-execution result and writing back an instruction-execution result to a register. In one embodiment, each of the pipeline units 435a, 435b simultaneously processes a plurality of instructions, with a different instruction processed in a different stage unit. For example, the pipeline unit 435a processes four instructions simultaneously. In a single clock cycle of the processor 104, the register fetch unit 403a fetches a first instruction, the execution unit 405a executes a second instruction, the data cache 407a buffers an instruction-execution result for a third instruction and the write back unit 409 writes an instruction-execution result for a fourth instruction to the register 411a.

In the illustrated embodiment shown in FIG. 4A, the error detector 303 detects an error when the instruction is executed in the execution unit 405b of the pipeline unit 435b in the core A 201. The error detector 303 generates an error signal and sends the error signal to the recovery engine 309. The error signal indicates that the execution unit 405b is the faulty stage unit, as illustrated by a cross depicted over the execution unit 405b in FIG. 4A.

Responsive to receiving the error signal, in one embodiment the recovery engine 309 selects the execution unit 405a in the pipeline unit 435a as a substitute stage unit. In one embodiment, the recovery engine 309 selects the execution unit 405a as a substitute stage unit for the faulty execution unit 405b when the execution unit 405a is idle. In another embodiment, the execution unit 405a is not idle and is executing another instruction that has a lower priority than the instruction executed in the execution unit 405b. The recovery engine 309 interrupts the execution of the instruction having a lower priority in the execution unit 405a and selects the execution unit 405a as a substitute stage unit for the faulty execution unit 405b. In yet another embodiment, the execution unit 405a is executing another instruction that has a higher priority than the instruction executed in the execution unit 405b. The recovery engine 309 does not interrupt the execution of the instruction having a higher priority in the execution unit 405a and selects another execution unit 405 in another pipeline unit 405 in the same core or in another core (e.g., a core B 203) as a substitute stage unit for the faulty execution unit 405b.

In one embodiment, the recovery engine 309 re-executes the instruction using the non-faulty stage units in the pipeline unit 435b (e.g., the register fetch unit 403b, the data cache 407b, the write back unit 409b) and the execution unit 405a of the pipeline unit 435a. The recovery engine 309 instructs the switch matrix 415 to switch the execution of the instruction from the execution unit 405b to the execution unit 405a by detouring data flow for instruction execution from the register fetch unit 403b to the execution unit 405a and then back to the data cache 407b. The data flow for instruction execution is illustrated as a dashed line 420 in FIG. 4A.

For example, the register fetch unit 403b fetches the instruction from the instruction queue 404 and stores the instruction temporarily. The switch matrix 415 retrieves the instruction stored in the register fetch unit 403b and sends the instruction to the execution unit 405a. The execution unit 405a executes the instruction and stores an instruction-execution result for the instruction in the switch matrix 415. The switch matrix 415 sends the instruction-execution result to the data cache 407b. The write back unit 409b retrieves the instruction-execution result from the data cache 407b and writes the instruction-execution result to the register 411b. A fallback for the execution unit 405b is therefore established using the execution unit 405a so that the execution of the instruction is not interrupted even if a failure of the execution unit 405b occurs.

In another embodiment, the recovery engine 309 re-executes the instruction using the non-faulty stage units of the pipeline unit 435b, the execution unit 405a and other stage units (e.g., the register fetch unit 403a, the data cache 407a, etc.) of the pipeline unit 435a. For example, the register fetch unit 403b fetches the instruction from the instruction queue 404 and stores the instruction temporarily. The switch matrix 415 transfers the fetched instruction stored in the register fetch unit 403b to the register fetch unit 403a. The execution unit 405a retrieves the instruction from the register fetch unit 403a and executes the instruction. The execution unit 405a stores an instruction-execution result for the instruction in the data cache 407a. The switch matrix 415 transfers the instruction-execution result stored in the data cache 407a to the data cache 407b. The data flow for the instruction execution is illustrated as a dashed line 422 in FIG. 4A. The write back unit 409b retrieves the instruction-execution result from the data cache 407b and writes the instruction-execution result to the register 411b.

One skilled in the art will recognize that, in other embodiments, an error may be detected in other stage units such as a register fetch unit 403b, a data cache 407b, etc., and the recovery engine 309 may establish a fallback for each of the other stage units by following the procedures herein.

FIG. 4B is a block diagram 450 illustrating a fallback between a first pipeline unit 435a in a first core A 201 and a second pipeline unit 435b in a second core B 203 according to one embodiment. Like reference numerals are used to refer to similar elements. For example, the programmable logic arrays 413a and 413b have similar structures and perform similar functionality as the programmable logic array 413 shown in FIG. 4A. The descriptions for FIG. 4B will not be repeated here. The difference between FIG. 4A and FIG. 4B is that the pipeline unit 435a and the pipeline unit 435b are in different cores and the switch matrix 213 switches the execution of instructions between two cores. The recovery engine 309 selects the execution unit 405a as a substitute stage unit for the faulty execution unit 405b. In one embodiment, the recovery engine 309 re-executes the instruction following a data flow depicted by a dashed line 440. In another embodiment, the recovery engine 309 re-executes the instruction following a data flow depicted by a dashed line 442.

Time Charts

Figure 5A:
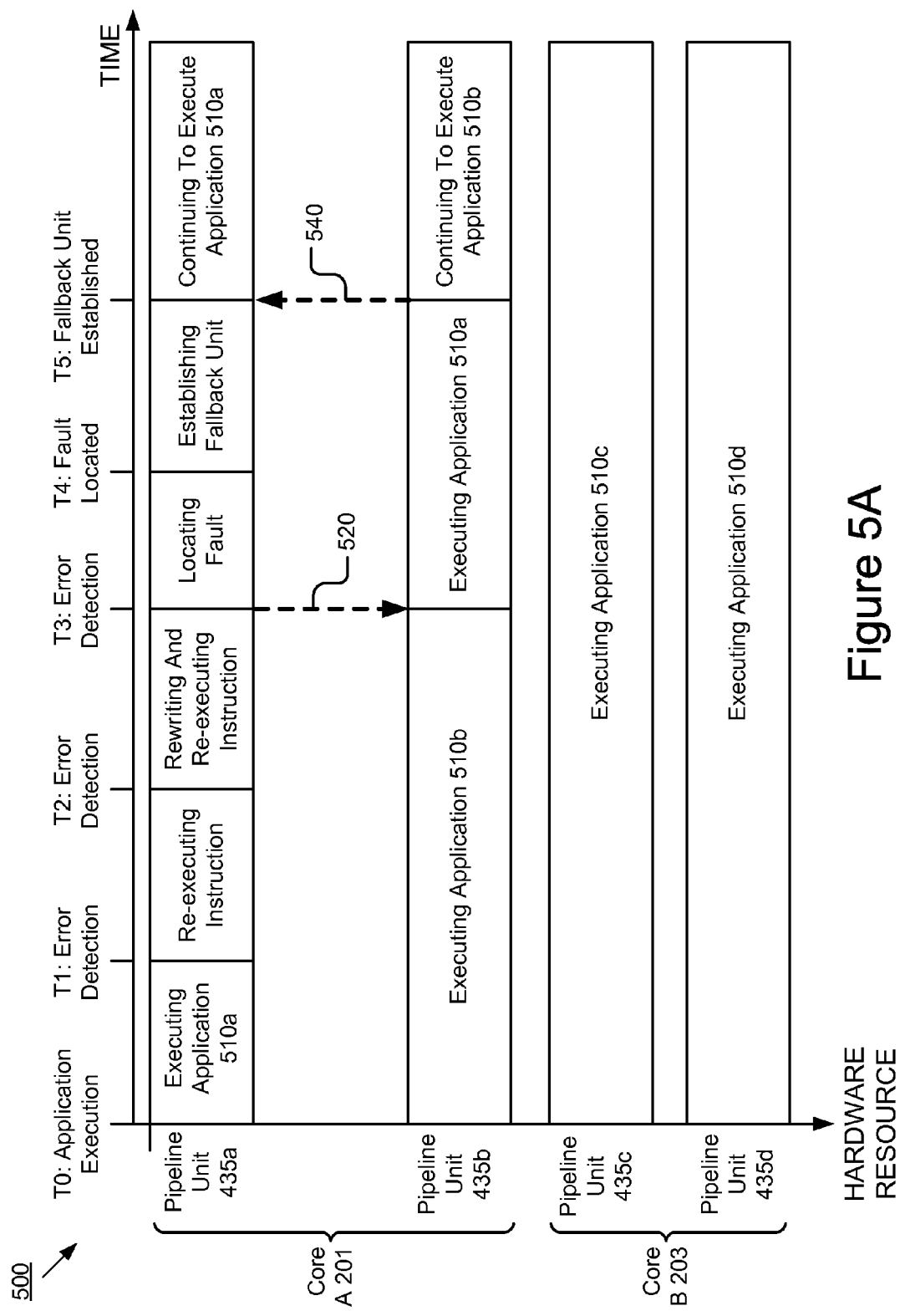
FIG. 5A is a time chart illustrating a process for establishing a fallback unit for a faulty component of a pipeline unit according to one embodiment.

FIG. 5A is a time chart illustrating a process 500 for establishing a fallback unit for a faulty component of a pipeline unit according to one embodiment. FIG. 5A depicts a coordinate including a horizontal axis and a vertical axis. The horizontal axis represents the time and the vertical axis represents hardware resources. FIG. 5A also depicts a core A 201 and a core B 203. The core A 201 comprises, among other things, a pipeline unit 435a and a pipeline unit 435b. The core B 203 comprises, among other things, a pipeline unit 435c and a pipeline unit 435d. The symbols "T0," "T1," "T2," "T3," "T4" and "T5" in the horizontal axis represent different time instances. For example, the symbol "T1" represents a time instance that the error detector 303 detects an error when executing an instruction in a pipeline unit 435a of a core A 201.

At a time instance T0, an application 510a including one or more instructions is executed in the pipeline unit 435a of the core A 201. Simultaneously, an application 510b is executed in the pipeline unit 435b of the core A 201. An application 510c is executed in the pipeline unit 435c of the core B 203. An application 510d is executed in the pipeline unit 435d of the core B 203.

In the illustrated embodiment, the error detector 303 detects a first error in a time instance T1 when an instruction from the application 510a is executed in the pipeline unit 435a. The error detector 303 determines a faulty stage unit in the pipeline unit 435a. For example, the error detector 303 detects an error in the time instance T1 when the instruction is executed in an execution unit of the pipeline unit 435a and the faulty stage unit is the execution unit of the pipeline unit 435a. The error detector 303 generates a first error signal and sends the first error signal to the recovery engine 309. The recovery engine 309 re-executes the instruction in the pipeline unit 435a responsive to receiving the first error signal.

In one embodiment, the error detector 303 detects a second error in a time instance T2 when the instruction is re-executed in the pipeline unit 435a. The error detector 303 generates a second error signal and sends the error signal to the recovery engine 309. The recovery engine 309 generates a rewritten command and sends the rewritten command to the rewriting module 307. The rewriting module 307 rewrites the instruction to form a rewritten instruction and sends the rewritten instruction to the recovery engine 309. The recovery engine 309 re-executes the rewritten instruction in the pipeline unit 435a.

In one embodiment, the error detector 303 detects a third error in a time instance T3 when the rewritten instruction is executed in the pipeline unit 435a. The error detector 303 generates a third error signal and sends the third error signal to the recovery engine 309. The recovery engine 309 interrupts the execution of the application 510b in the pipeline unit 435b and re-executes the instruction in the pipeline unit 435b as indicated by a dashed line 520 in FIG. 5A. For example, if an error occurs when executing the rewritten instruction in the pipeline unit 435a, the recovery engine 309 instructs a switch matrix 415 to switch the execution of the instruction from the pipeline unit 435a to the pipeline unit 435b. In one embodiment, the recovery engine 309 interrupts the execution of the application 510b in the pipeline unit 435b only when the application 510a has a higher priority than the application 510b. The recovery engine 309 continues to use the pipeline unit 435b to execute next instructions from the application 510a.

In one embodiment, the recovery engine 309 selects a substitute stage unit for the faulty stage unit from the pipeline unit 435b and executes instructions using the non-faulty stage units of the pipeline unit 435a and the substitute stage unit in the pipeline unit 435b. For example, the recovery engine 309 executes a next instruction by using a fetch register unit of the pipeline unit 435a, an execution unit of the pipeline unit 435b, a data cache of the pipeline unit 435a and a write back unit of the pipeline unit 435a.

The fault locator 305 begins to locate a faulty component of the faulty stage unit in the pipeline unit 435a that incurs the errors. For example, the fault locator 305 applies a BIST circuit to search for the faulty component of the faulty stage unit. In a time instance T4, the faulty component of the faulty stage unit in the pipeline unit 435a is located. For example, the fault locator 305 has located a faulty component of an execution unit in the pipeline unit 435a as a faulty multiplier in the time instance T4. The fallback programming module 311 configures a programmable logic array 413 to establish a fallback unit for the faulty component of the faulty stage unit in the pipeline 435a. In a time instance T5, the fallback unit for the faulty component of the faulty stage unit is established and is used to replace the faulty component for instruction execution. The recovery engine 309 stops using the pipeline unit 435b to execute instructions for the application 510a. The recovery engine 309 continues to execute the instructions using the pipeline unit 435a as illustrated by a dashed line 540, with the faulty component replaced by the fallback unit. The pipeline unit 435b therefore continues to execute instructions for the application 510b.

Figure 5B:
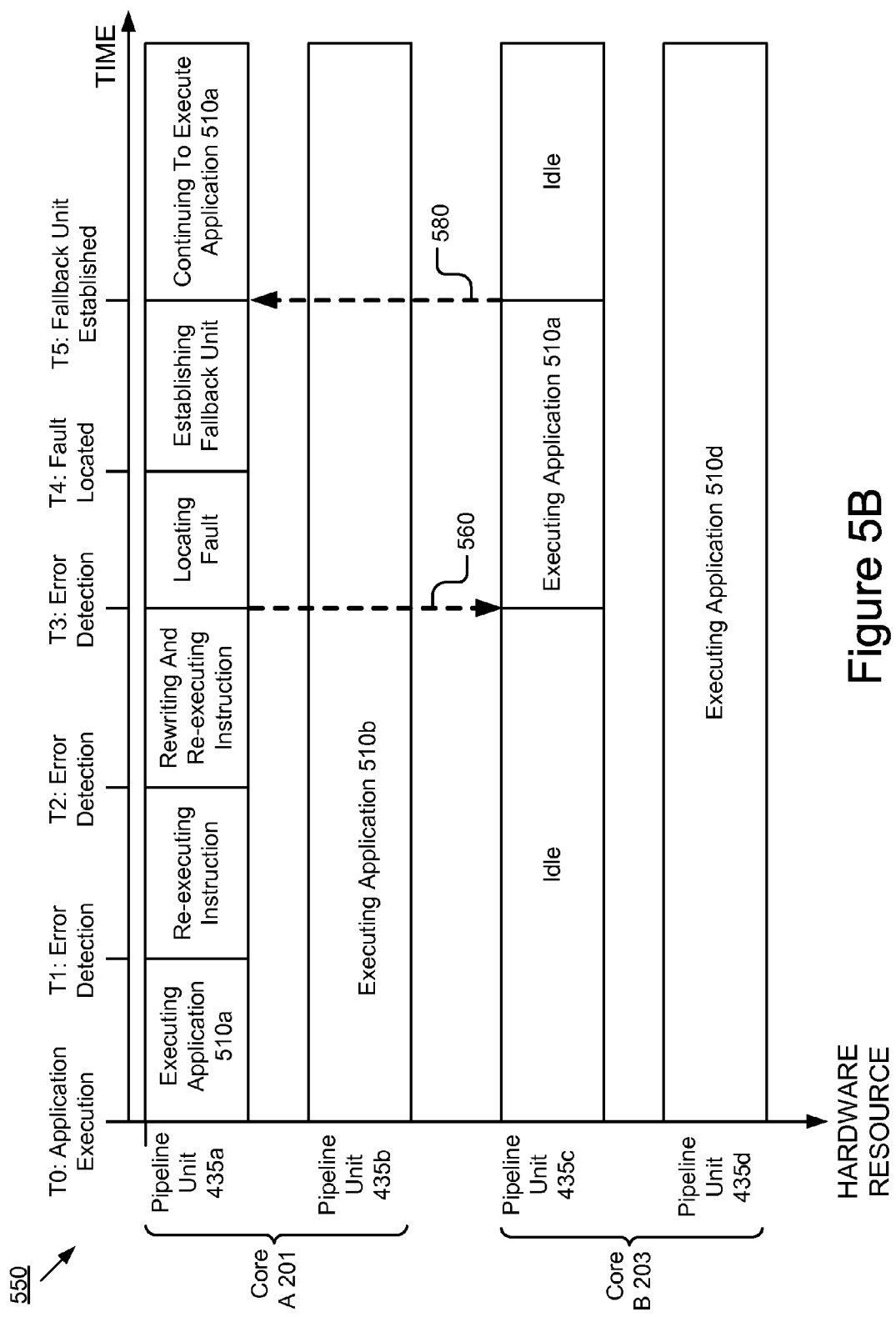
FIG. 5B is a time chart illustrating a process for establishing a fallback unit for a faulty component of a pipeline unit according to another embodiment.

FIG. 5B is a time chart illustrating a process 550 for establishing a fallback unit for a faulty component of a pipeline unit according to another embodiment. Like reference numerals are used to refer to similar elements and the descriptions for the elements will not be repeated here. The difference between FIG. 5A and FIG. 5B is that in FIG. 5B the pipeline unit 435c of the core B 203 is idle and the application 510b executed in the pipeline unit 435b has a higher priority than the application 510a executed in the pipeline unit 435a. The recovery engine 309 will not interrupt the execution of the application 510b in the pipeline unit 435b when an error is detected in the pipeline unit 435a in the time instance T3. Instead, the recovery engine 309 re-executes the instruction in the pipeline unit 435c of the core B 203 as illustrated by a dashed line 560 because the pipeline unit 435c is idle. The recovery engine 309 continues to execute next instructions for the application 510a in the pipeline unit 435c.

When the fallback programming module 311 has configured a programmable logic array 413 to establish a fallback unit for the faulty component of the pipeline unit 435a in the time instance T5, the recovery engine 309 stops using the pipeline unit 435c to execute instructions for the application 510a. The recovery engine 309 returns to execute instructions for the application 510a using resources in the pipeline unit 435a as illustrated by a dashed line 580. For example, the recovery engine 309 executes instructions for the application 510a in the pipeline unit 435a and applies the programmable logic array 413 to perform the functionality of the faulty component of the pipeline unit 435a.

Methods

Figure 6A:
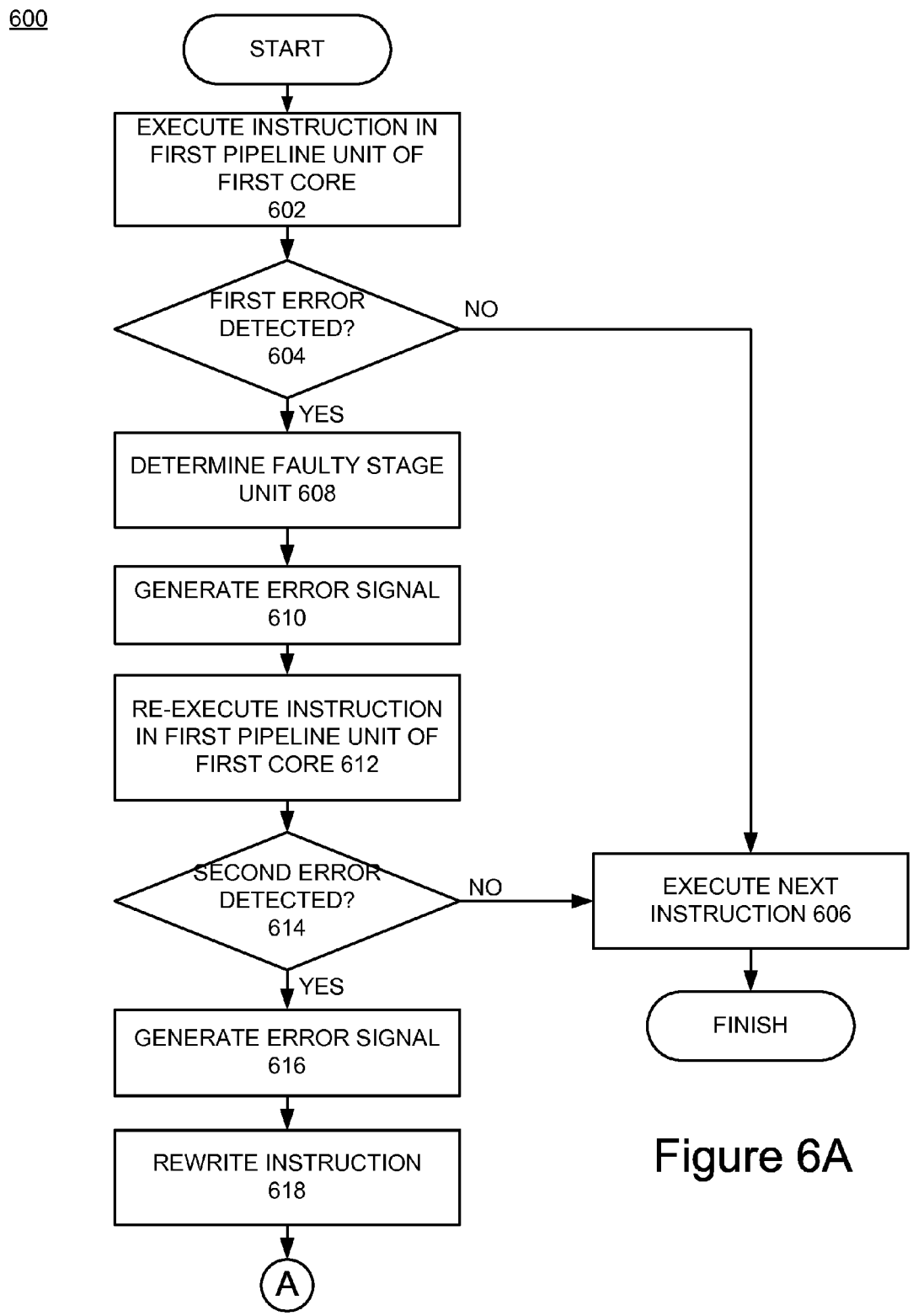
FIGS. 6A-6D are flowcharts illustrating a method for providing a fault-tolerant basis to execute instructions according to one embodiment.

FIGS. 6A-6D are flowcharts illustrating a method 600 for providing a fault-tolerant basis to execute instructions according to one embodiment. Turning to FIG. 6A, an instruction is executed 602 in a first pipeline unit of a first core. The error detector 303 monitors the execution of the instruction and determines 604 whether a first error is detected. If the error detector 303 does not detect any error, the method 600 moves to step 606. Otherwise, the method 600 moves to step 608. At step 606, a next instruction is executed in the first pipeline unit of the first core and the method 600 ends. Turning to step 608, the error detector 303 determines a faulty stage unit in the first pipeline unit of the first core. For example, the error detector 303 determines that an execution unit in the first pipeline unit is the faulty stage unit because the error occurs in the execution unit. The error detector 303 generates 610 a first error signal and sends the first error signal to the recovery engine 309.

The recovery engine 309 receives the first error signal from the error detector 303. The recovery engine 309 re-executes 612 the instruction in the first pipeline unit of the first core. For example, the recovery engine 309 generates a command and sends the command to the first core, causing the first core to re-execute the instruction in the first pipeline unit. The error detector 303 monitors the re-execution of the instruction and determines 614 whether a second error is detected. If the error detector 303 does not detect any other error, the method 600 moves to step 606. Otherwise, the method 600 moves to step 616. At step 616, the error detector 303 generates a second error signal including an identifier of the faulty stage unit and sends the second error signal to the recovery engine 309.

The recovery engine 309 instructs the rewriting module 307 to rewrite 618 the instruction responsive to receiving the second error signal. The rewriting module 307 rewrites 618 the instruction and generates a rewritten instruction. The rewriting module 307 sends the rewritten instruction to the recovery engine 309.

Figure 6B:
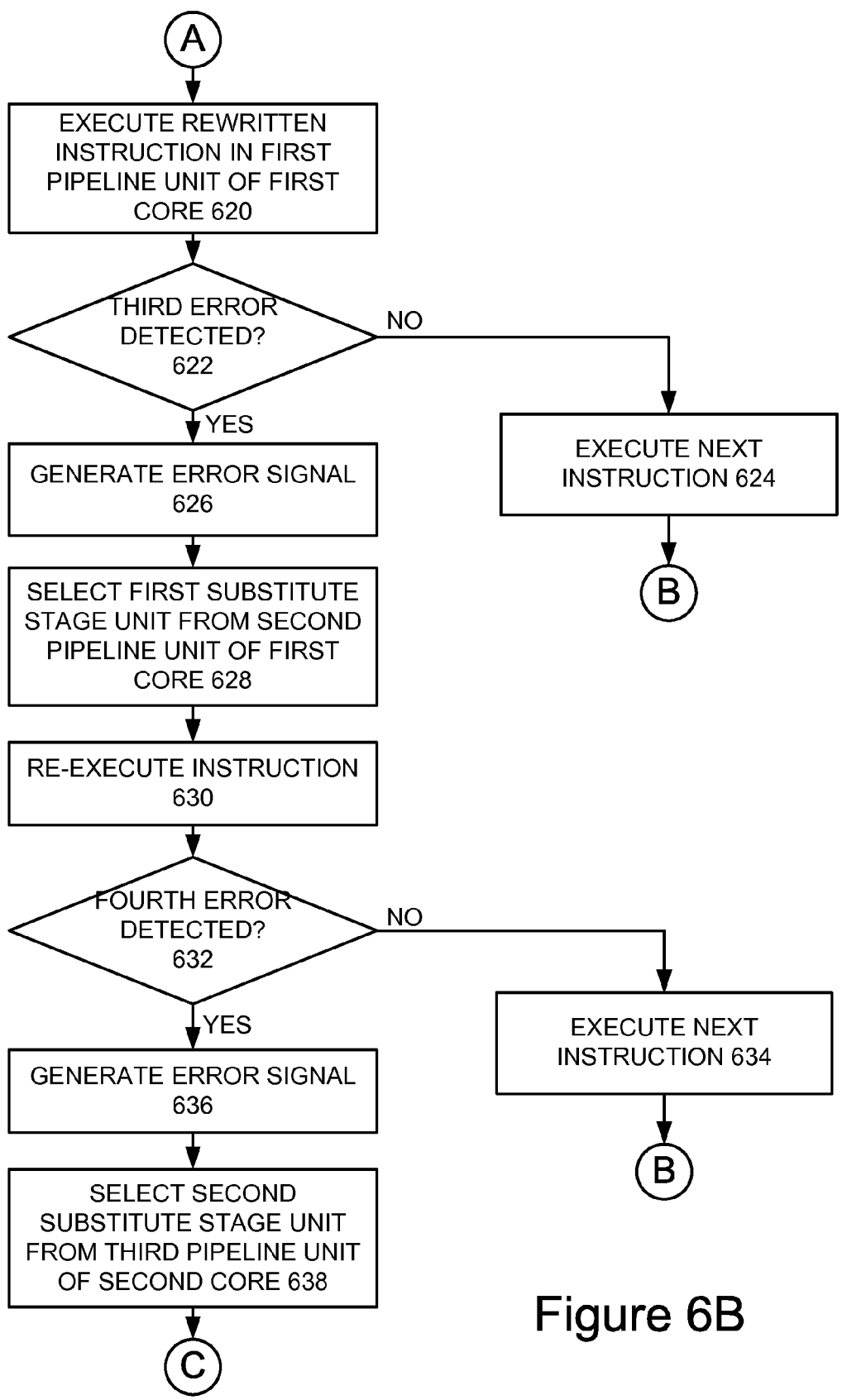

Referring now to FIG. 6B, the recovery engine 309 executes 620 the rewritten instruction in the first pipeline unit of the first core. For example, the recovery engine 309 generates a command and sends the command to the first core, causing the first core to execute the rewritten instruction in the first pipeline unit of the first core. The error detector 303 monitors the execution of the rewritten instruction and determines 622 whether a third error is detected. If the error detector 303 does not detect any other error, the method moves to step 624. Otherwise, the method moves to step 626. At step 624, the recovery engine 309 executes 624 a next instruction in the first pipeline unit of the first core. In one embodiment, the rewriting module 307 rewrites the next instruction to form a rewritten instruction and the recovery engine 309 executes the rewritten instruction for the next instruction in the first pipeline unit of the first core.

Turning to step 626, the error detector 303 generates a third error signal including the identifier of the faulty stage unit and sends the third error signal to the recovery engine 309. The recovery engine 309 retrieves the identifier of the faulty stage unit from the third error signal. The recovery engine 309 selects 628 a first substitute stage unit for the faulty stage unit from a second pipeline unit of the first core. In one embodiment, the recovery engine 309 selects a first substitute stage unit from a second pipeline unit of the first core when the instructions executed in the second pipeline unit have a lower priority than the instruction executed in the first pipeline unit. The recovery engine 309 re-executes 630 the instruction using the first substitute stage unit in the second pipeline unit and other non-faulty stage units in the first pipeline unit of the first core.

The error detector 303 monitors the re-execution of the instruction using the first substitute stage unit in the second pipeline unit and other non-faulty stage units in the first pipeline unit of the first core. The error detector 303 determines 632 whether a fourth error is detected. If the error detector 303 does not detect any other error, the method moves to step 634. Otherwise, the method moves to step 636. At step 634, the recovery engine 309 executes a next instruction using the first substitute stage unit in the second pipeline unit and other non-faulty stage units in the first pipeline unit of the first core.

Turning to step 636, the error detector 303 generates a fourth error signal and sends the fourth error signal to the recovery engine 309. The recovery engine 309 selects 638 a second substitute stage unit for the faulty stage unit from a third pipeline unit of a second core. In one embodiment, the recovery engine 309 selects the second substitute stage unit from the third pipeline unit of the second core when the instructions executed in the third pipeline unit have a lower priority than the instruction.

Figure 6C:
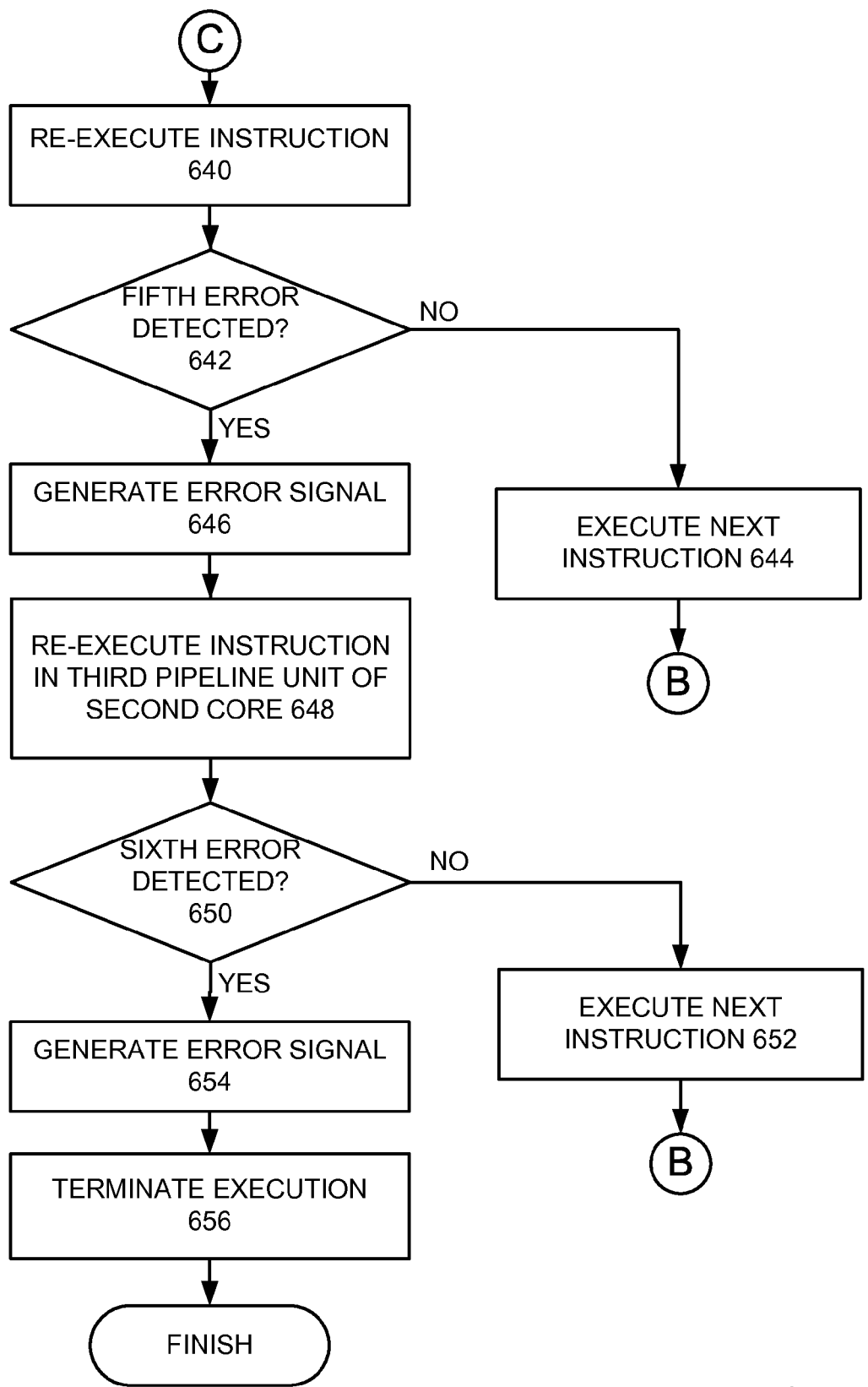

Referring to FIG. 6C, the recovery engine 309 re-executes 640 the instruction using the second substitute stage unit in the third pipeline unit of the second core and other non-faulty stage units in the first pipeline unit of the first core. The error detector 303 monitors the re-execution of the instruction using the second substitute stage unit in the third pipeline unit of the second core and other non-faulty stage units in the first pipeline unit of the first core. The error detector 303 determines 642 whether a fifth error is detected. If the error detector 303 does not detect any other error, the method moves to step 644. Otherwise, the method moves to step 646. At step 644, the recovery engine 309 executes a next instruction using the second substitute stage unit in the third pipeline unit of the second core and other non-faulty stage units in the first pipeline unit of the first core.

Turning to step 646, the error detector 303 generates a fifth error signal and sends the fifth error signal to the recovery engine 309. The recovery engine 309 re-executes 648 the instruction in the third pipeline unit of the second core without using any non-faulty stage units in the first pipeline unit of the first core. The error detector 303 monitors the re-execution of the instruction in the third pipeline unit of the second core. The error detector 303 determines 650 whether a sixth error is detected. If the error detector 303 does not detect any other error, the method moves to step 652. Otherwise, the method moves to step 654. At step 652, the recovery engine 309 executes a next instruction in the third pipeline unit of the second core.

Turning to step 654, the error detector generates a sixth error signal and sends the sixth error signal to the recovery engine 309. The recovery engine 309 terminates 656 the execution of the instruction and reports the errors to an administrator of the system 100.

Figure 6D:
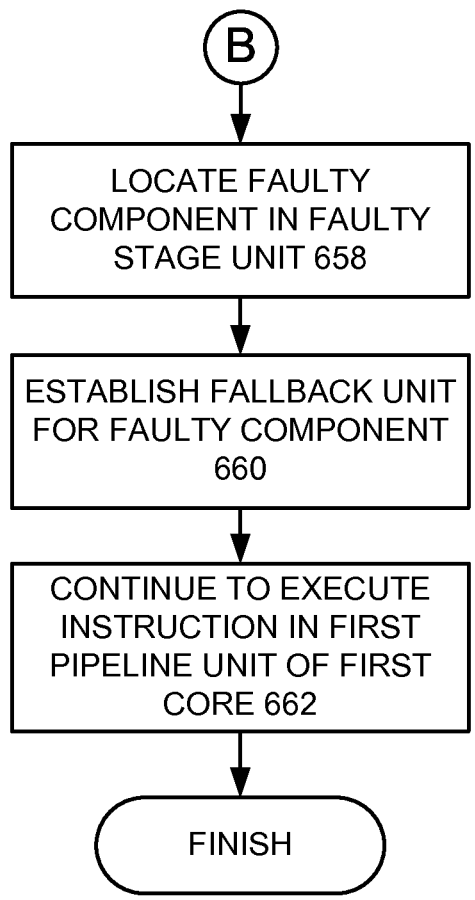

Referring to FIG. 6D, the fault locator 305 locates 658 a faulty component in the faulty stage unit. The fault locator 305 sends an identifier of the faulty component to the fallback programming module 311. The fallback programming module 311 establishes 660 a fallback unit for the faulty component. The recovery engine 309 continues 662 to execute instructions in the first pipeline unit of the first core by replacing the faulty component with the fallback unit.

The foregoing description of the example embodiments has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for providing a fault-tolerant basis to execute instructions, the method comprising:
  detecting a first error in the execution of an instruction in a faulty stage unit of a first pipeline unit in a first core;
  rewriting the instruction to form a rewritten instruction in response to the detection of the first error;
  executing the rewritten instruction in the first pipeline unit;
  determining if a second error occurs in the execution of the rewritten instruction;
  responsive to determining the occurrence of the second error,
    selecting a first substitute stage unit for the faulty stage unit from a second pipeline unit in the first core, and
    re-executing the instruction in the first substitute stage unit of the second pipeline unit and non-faulty stage units of the first pipeline unit in the first core;
  determining whether a third error occurs in the execution of the instruction in the first substitute stage unit of the second pipeline unit and the non-faulty stage units of the first pipeline unit;
  responsive to detecting the third error, re-executing the instruction in a second substitute stage unit of a third pipeline unit in a second core;
  locating a faulty component for the faulty stage unit; and
  establishing a fallback unit for the faulty component.

2. The method of claim 1 further comprises:
  determining whether a fourth error occurs in the execution of the instruction in the second substitute stage unit of the third pipeline unit in the second core and the non-faulty stage units in the first core; and
  responsive to detecting the fourth error, re-executing the instruction in the third pipeline unit in the second core.

3. The method of claim 1, wherein establishing the fallback unit comprises configuring a programmable logic array to replace the faulty component of the faulty stage unit.

4. The method of claim 1, wherein the rewritten instruction when executed performs an operation that the instruction performs.

5. The method of claim 1, wherein the substitute stage unit is a stage unit that provides functionality that the faulty stage unit provides.

6. The method of claim 1 further comprising:
  selecting a third substitute stage unit for the faulty stage unit in a fourth pipeline unit in the first core responsive to the detection of the second error; and
  re-executing the instruction in the third substitute stage unit of the fourth pipeline unit and non-faulty stage units of the first pipeline unit in the first core.

7. A system for providing a fault-tolerant basis to execute instructions, the system comprising:
  one or more processors;
  an error detector executable by the one or more processors to detect a first error in the execution of an instruction in a faulty stage unit of a first pipeline unit in a first core, the error detector further configured to determine if a second error occurs in the execution of a rewritten instruction in the first pipeline unit and to determine whether a third error occurs in the execution of the instruction in the first substitute stage unit of the second pipeline unit and the non-faulty stage units of the first pipeline unit;
  a rewriting engine communicatively coupled to the error detector, the rewriting module executable by the one or more processors to rewrite the instruction to form the rewritten instruction in response to the detection of the first error;
  a recovery engine communicatively coupled to the error detector and the rewriting module, the recovery engine executable by the one or more processors to execute the rewritten instruction in the first pipeline unit, the recovery engine further configured to:
    select a first substitute stage unit for the faulty stage unit from a second pipeline unit in the first core responsive to determining the occurrence of the second error,
    re-execute the instruction in the first substitute stage unit of the second pipeline unit and non-faulty stage units of the first pipeline unit in the first core; and
    re-execute the instruction in a second substitute stage unit of a third pipeline unit in a second core responsive to detecting the third error;
  a fault locator communicatively coupled to the error detector and the recovery engine, the fault locator executable by the one or more processors to locate a faulty component for the faulty stage unit; and
  a fallback programming module communicatively coupled to the recovery engine and the fault locator, the fallback programming module executable by the one or more processors to establish a fallback unit for the faulty component.

8. The system of claim 7, wherein the error detector is further configured to determine whether a fourth error occurs in the execution of the instruction in the second substitute stage unit of the third pipeline unit in the second core and the non-faulty stage units in the first core, and the recovery engine is further configured to re-execute the instruction in the third pipeline unit in the second core responsive to detecting the fourth error.

9. The system of claim 7, wherein the fallback programming module is further configured to configure a programmable logic array to replace the faulty component of the faulty stage unit.

10. The system of claim 7, wherein the rewritten instruction when executed performs an operation that the instruction performs.

11. The system of claim 7, wherein the substitute stage unit is a stage unit that provides functionality that the faulty stage unit provides.

12. The system of claim 7, wherein the recovery engine is further configured to:
  select a third substitute stage unit for the faulty stage unit in a fourth pipeline unit in the first core responsive to the detection of the second error; and
  re-execute the instruction in the third substitute stage unit of the fourth pipeline unit and non-faulty stage units of the first pipeline unit in the first core.

13. A computer program product comprising a non-transitory computer readable medium storing a computer readable program that, in response to execution by a computing device, causes the computing device to perform operations comprising:
  detecting a first error in the execution of an instruction in a faulty stage unit of a first pipeline unit in a first core;

rewriting the instruction to form a rewritten instruction in response to the detection of the first error;
executing the rewritten instruction in the first pipeline unit;
determining if a second error occurs in the execution of the rewritten instruction;
responsive to determining the occurrence of the second error,
 selecting a first substitute stage unit for the faulty stage unit from a second pipeline unit in the first core, and
 re-executing the instruction in the first substitute stage unit of the second pipeline unit and non-faulty stage units of the first pipeline unit in the first core;
determining whether a third error occurs in the execution of the instruction in the first substitute stage unit of the second pipeline unit and the non-faulty stage units of the first pipeline unit;
responsive to detecting the third error, re-executing the instruction in a second substitute stage unit of a third pipeline unit in a second core;
locating a faulty component for the faulty stage unit; and
establishing a fallback unit for the faulty component.

14. The computer program product of claim 13, wherein the computer program causes the computing device to perform operations further comprising:
 determining whether a fourth error occurs in the execution of the instruction in the second substitute stage unit of the third pipeline unit in the second core and the non-faulty stage units in the first core; and
 responsive to detecting the fourth error, re-executing the instruction in the third pipeline unit in the second core.

15. The computer program product of claim 13, wherein establishing the fallback unit comprises configuring a programmable logic array to replace the faulty component of the faulty stage unit.

16. The computer program product of claim 13, wherein the rewritten instruction when executed performs an operation that the instruction performs.

17. The computer program product of claim 13, wherein the substitute stage unit is a stage unit that provides functionality that the faulty stage unit provides.

* * * * *